(12) United States Patent
Chu et al.

(10) Patent No.: US 10,080,222 B1
(45) Date of Patent: Sep. 18, 2018

(54) ORTHOGONAL FREQUENCY DIVISION MULTIPLE ACCESS SHORT FRAME FORMAT

(71) Applicant: Marvell International Ltd., Hamilton (BM)

(72) Inventors: Liwen Chu, San Ramon, CA (US); Hongyuan Zhang, Fremont, CA (US); Lei Wang, San Diego, CA (US); Jinjing Jiang, San Jose, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 142 days.

(21) Appl. No.: 14/961,512

(22) Filed: Dec. 7, 2015

Related U.S. Application Data

(60) Provisional application No. 62/088,008, filed on Dec. 5, 2014, provisional application No. 62/112,967, filed
(Continued)

(51) Int. Cl.
*H04W 72/04* (2009.01)
*H04L 5/00* (2006.01)

(52) U.S. Cl.
CPC ......... *H04W 72/044* (2013.01); *H04L 5/0007* (2013.01)

(58) Field of Classification Search
CPC ........................... H04W 72/044; H04L 5/0007
See application file for complete search history.

(56) References Cited

U.S. PATENT DOCUMENTS 8,867,653 B2  10/2014  Zhang et al.
8,948,283 B2  2/2015  Zhang
(Continued)

FOREIGN PATENT DOCUMENTS

WO  WO-2012/122119  9/2012

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
(Continued)

*Primary Examiner* — Alex Skripnikov
*Assistant Examiner* — Sharmin Chowdhury

(57) ABSTRACT

A method for transmitting an orthogonal frequency division multiple access (OFDMA) data unit is described. Respective sub-channels of an orthogonal frequency division multiplexing (OFDM) communication channel are allocated to first and second communication devices for simultaneous OFDM transmission. A first sub-channel is allocated to the first communication device and a second sub-channel is allocated to the second communication device. Indications of the respective allocated sub-channels are transmitted to the first and second communication devices. A medium access control (MAC) protocol data unit (MPDU) is generated that omits i) a MAC address of a transmitter, and ii) a MAC address of the first communication device. An OFDMA data unit including the MPDU is transmitted by the transmitter via the first sub-channel to the first communication device.

32 Claims, 18 Drawing Sheets

Related U.S. Application Data on Feb. 6, 2015, provisional application No. 62/140,393, filed on Mar. 30, 2015, provisional application No. 62/146,062, filed on Apr. 10, 2015.

(56) References Cited

U.S. PATENT DOCUMENTS

| | | | |
|---|---|---|---|
| 9,088,908 B2 | 7/2015 | Liu | |
| 9,130,727 B2 | 9/2015 | Zhang et al. | |
| 2006/0078001 A1* | 4/2006 | Chandra | H04L 12/46 370/473 |
| 2008/0045153 A1* | 2/2008 | Surineni | H04B 7/0417 455/63.1 |
| 2009/0196163 A1 | 8/2009 | Du | |
| 2011/0149918 A1* | 6/2011 | Gong | H04W 72/005 370/336 |
| 2011/0164586 A1* | 7/2011 | Kim | H04W 28/06 370/329 |
| 2012/0294294 A1 | 11/2012 | Zhang | |
| 2013/0128809 A1* | 5/2013 | Wentink | H04L 29/0604 370/328 |
| 2013/0202001 A1 | 8/2013 | Zhang | |
| 2013/0229996 A1* | 9/2013 | Wang | H04W 72/0413 370/329 |
| 2014/0010162 A1* | 1/2014 | Cho | H04W 88/04 370/328 |
| 2015/0131517 A1 | 5/2015 | Chu et al. | |
| 2016/0330788 A1* | 11/2016 | Zheng | H04W 28/0205 |

OTHER PUBLICATIONS

Hiertz et al., "The IEEE 802.11 Universe," IEEE Communications Magazine, pp. 62-70, (Jan. 2010).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

IEEE Std 802.11ac/D2.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11ah™/D1.0 "Draft STANDARD for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

Yu et al., "Coverage extension for IEEE802.11ah," *The Institute of Electrical and Electronics Engineers*, doc. No. IEEE 802.11-11/0035r1, pp. 1-10 (Jan. 2011).

Taghavi et al., "Introductory Submission for TGah", doc. No. IEEE 802.11-11/0062r0, *Institute for Electrical and Electronics Engineers*, pp. 1-5 (Jan. 14, 2011).

de Vegt, "Potential Compromise for 802.11ah Use Case Document", Institute of Electrical and Electronics Engineers, doc. No. IEEE 802.11-11/0457r0, pp. 1-27 (Mar. 2011).

Zhang et al., "11ah Data Transmission Flow," *The Institute of Electrical and Electronics Engineers*, doc. No. IEEE 802.11-11/1484r1, pp. 1-15 (Nov. 2011).

Park, "Proposed Specification Framework for TGah", *The Institute of Electrical and Electronics Engineers*, doc. No. IEEE 802.11-11/1137r6, pp. 1-13 (Mar. 2012).

Park, "Proposed Specification Framework for TGah D9.x", The Institute of Electrical and Electronics Engineers, doc. No. IEEE 802.11-yy/xxxxr0, pp. 1-30 (Jul. 2012).

Vermani et al. "Preamble Format for 1 MHz," *The Institute of Electrical and Electronics Engineers*, doc. No. IEEE 802.11-11/1482r2, pp. 1-30 (Nov. 2011).

Zhang et al., "1MHz Waveform in Wider BW ", *The Institute of Electrical and Electronics Engineers*, doc. No. IEEE 802.11-12/0309r1, pp. 1-10 (Mar. 2012).

Vermani et al. "Spec Framework Text for PHY Numerology," *The Institute of Electrical and Electronics Engineers*, doc. No. IEEE 802.11-11/1311r0, pp. 1-5 (Sep. 2011).

Park, "Proposed Specification Framework for TGah", *The Institute of Electrical and Electronics Engineers*, doc. No. IEEE 802.11-11/1137r11, pp. 1-36 (Sep. 2012).

Park, "Specification Framework for TGah," *The Institute of Electrical and Electronics Engineers*, doc. No. IEEE 802.11-11/1137r13, pp. 1-58 (Jan. 14, 2013).

Zhang et al., "Beamforming Feedback for Single Stream," *The Institute of Electrical and Electronics Engineers*, doc. No. IEEE 802.11-12/1312r0, pp. 1-22 (Nov. 12, 2012).

Shao, "Channel Selection for 802.11ah," doc.: IEEE 802.11-12/0816r0, pp. 1-11 (Jul. 2012).

Park, "Proposed Specification Framework for TGah", *The Institute of Electrical and Electronics Engineers*, doc. No. IEEE 802.11-yy/xxxxr05, pp. 1-12 (Jan. 2012).

(56) References Cited

OTHER PUBLICATIONS

Park et al., "Low Power Capability Support for 802.11ah," doc. No. IEEE 802.11-11/0060r1, *The Institute for Electrical and Electronics Engineers*, 7 pages (Jan. 17, 2011).
Chun et al., "Legacy Support on HEW frame structure," doc: IEEE 11-13/1057r0, *The Institute of Electrical and Electronics Engineers, Inc.*, pp. 1-8 (Sep. 2013).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).
U.S. Appl. No. 14/961,359, entitled "Basic Service Set Color Identifier," filed Dec. 7, 2015.
U.S. Appl. No. 15/019,768, entitled "Orthogonal Frequency Division Multiple Access Resource Request," filed Feb. 9, 2016.

\* cited by examiner

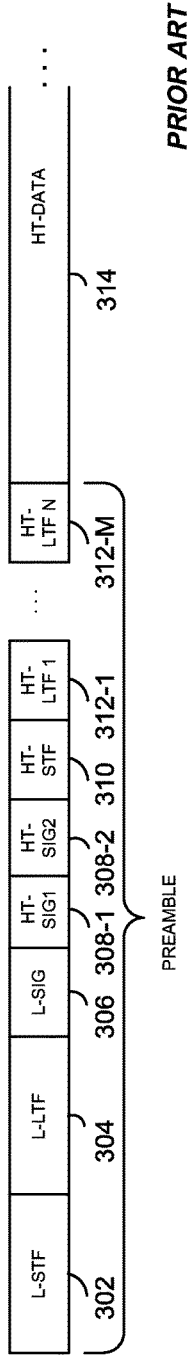
FIG. 3 *PRIOR ART*
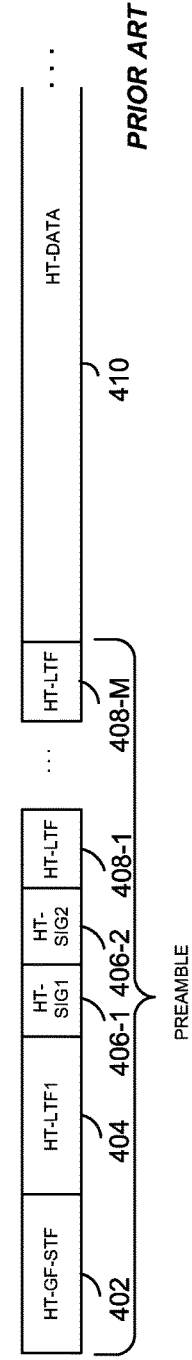
FIG. 4 *PRIOR ART*
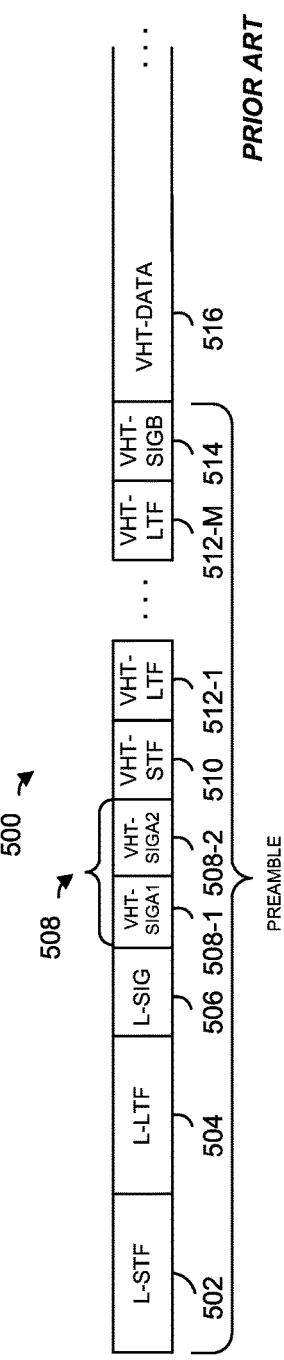
FIG. 5 *PRIOR ART*

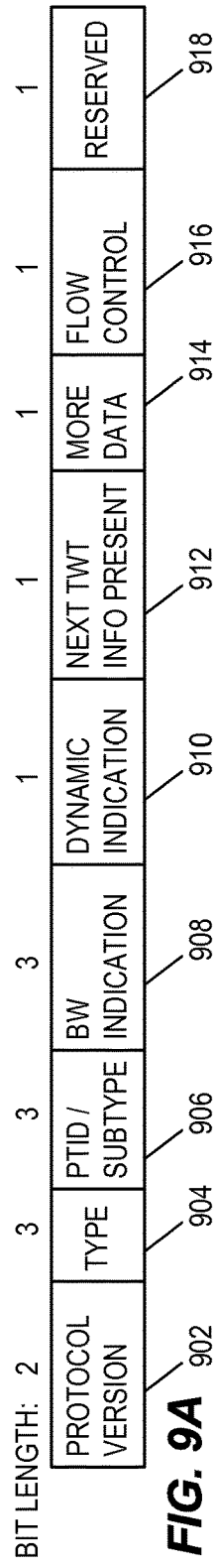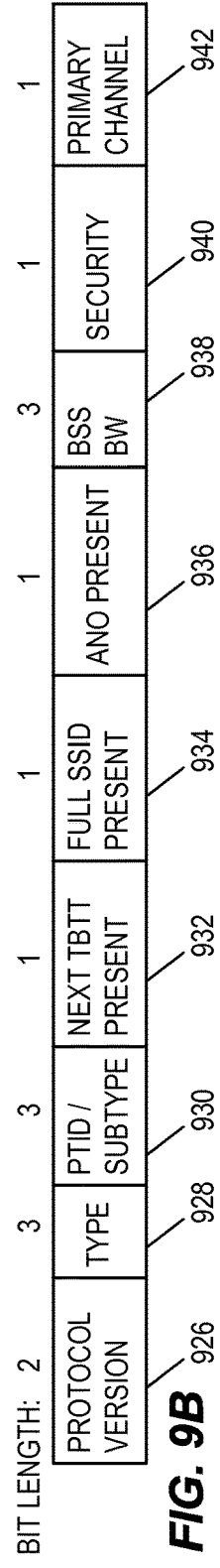

950

| PROTOCOL VERSION | TYPE | PTID / SUBTYPE | SLOT MODE | MORE FRAGMENTS | POWER MGMT | GROUP INDICATOR | PROTECTED FRAME | END OF SERVICE | RELAYED FRAME | ACK POLICY |
|---|---|---|---|---|---|---|---|---|---|---|
| 952 | 954 | 956 | 958 | 960 | 962 | 964 | 966 | 968 | 970 | 972 |

BIT LENGTH: 2, 3, 3, 1, 1, 1, 1, 1, 1, 1, 1

| PROTOCOL VERSION | TYPE | PTID / SUBTYPE | FROM DS | MORE FRAGMENTS | POWER MGMT | MORE DATA | PROTECTED FRAME | END OF SERVICE | RELAYED FRAME | ACK POLICY |
|---|---|---|---|---|---|---|---|---|---|---|
| 976 | 978 | 980 | 982 | 984 | 986 | 988 | 990 | 992 | 994 | 996 |

BIT LENGTH: 2, 3, 3, 1, 1, 1, 1, 1, 1, 1, 1

FIG. 9D

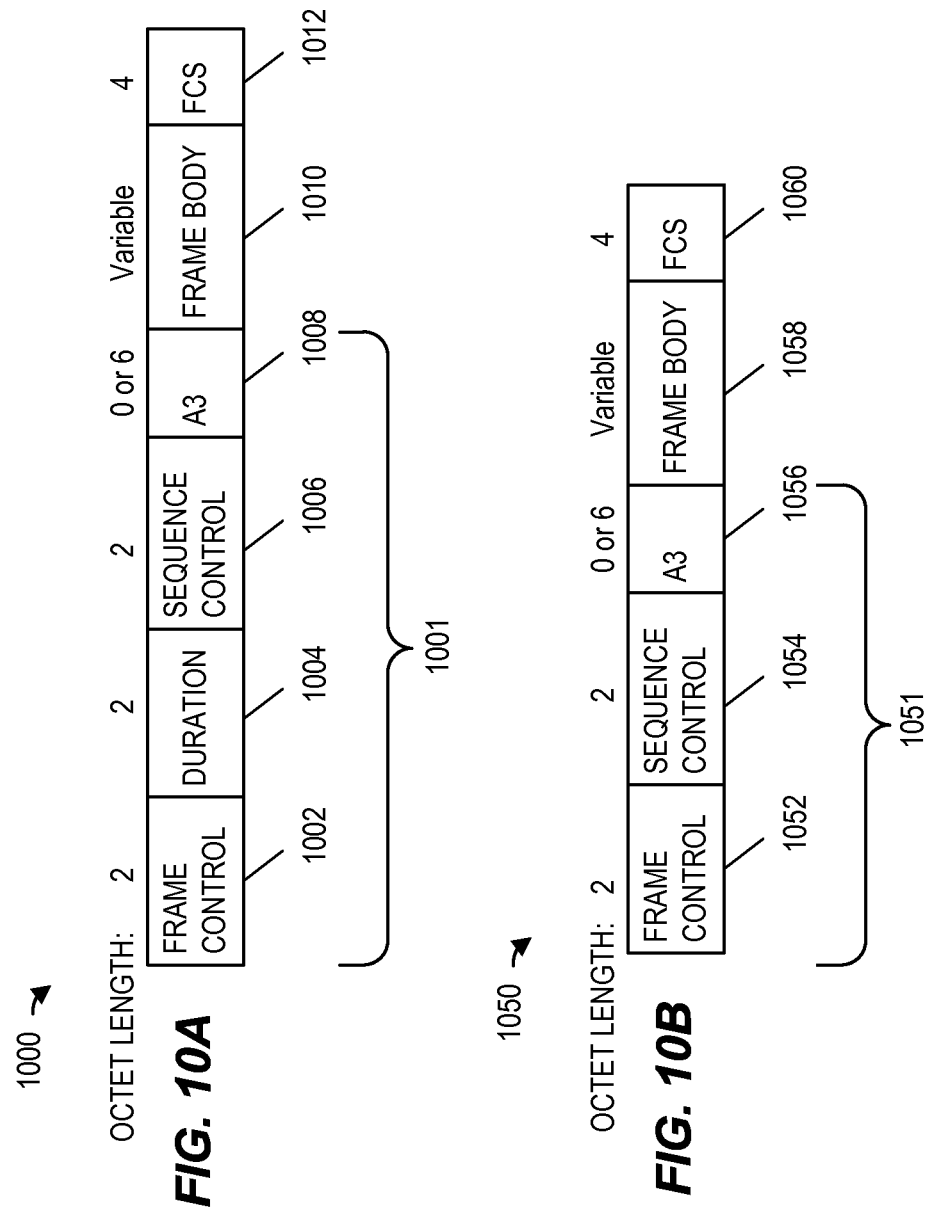

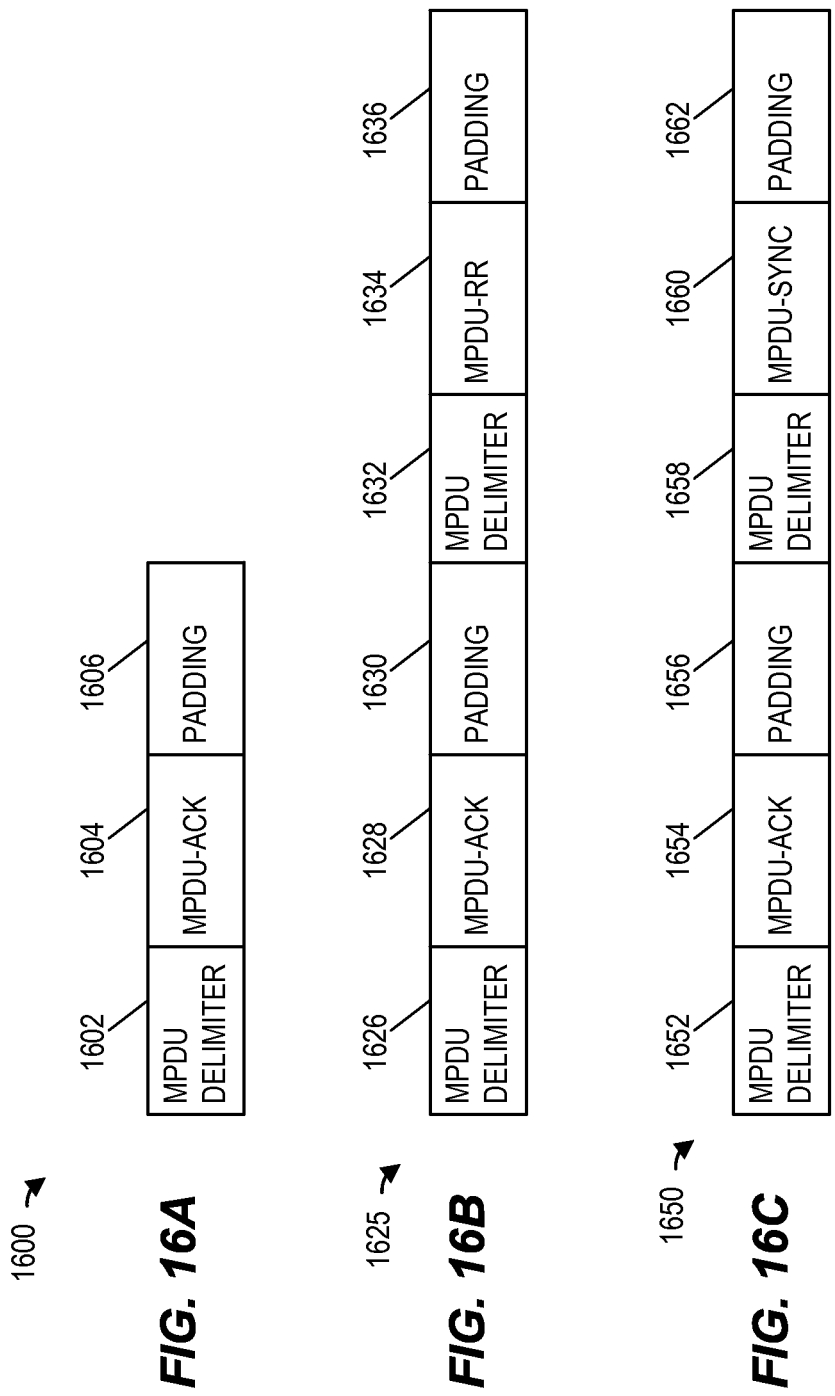

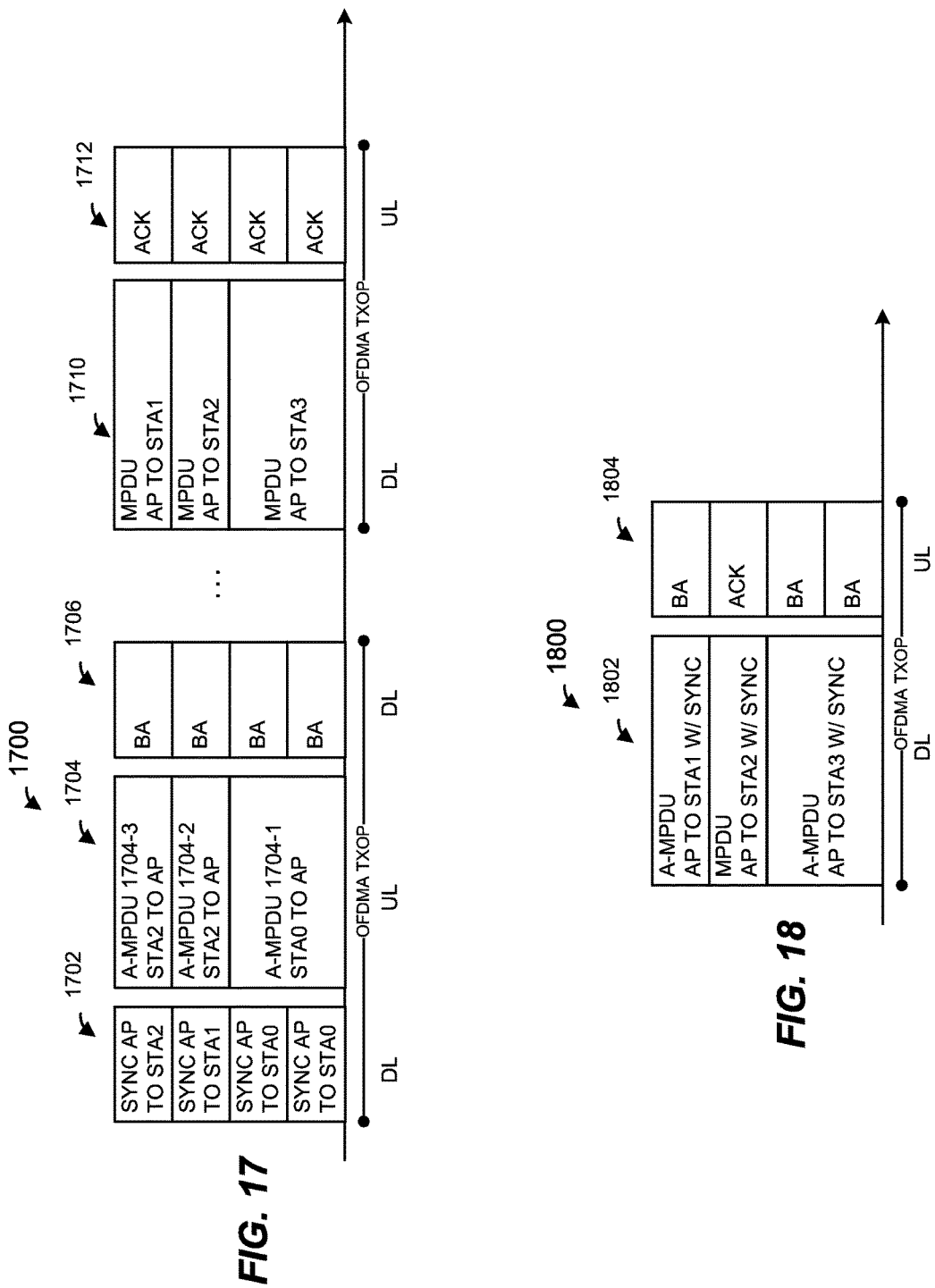

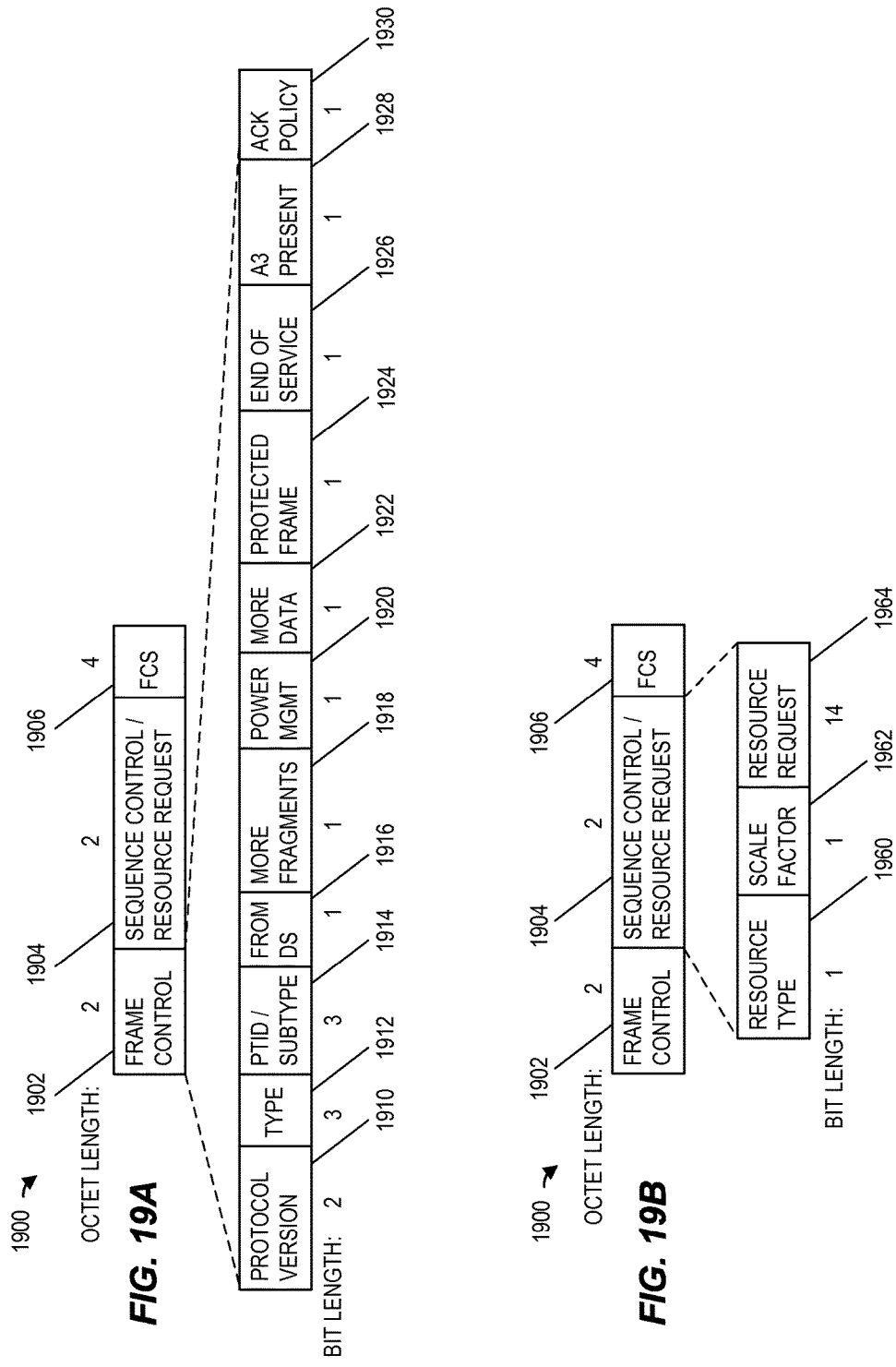

ORTHOGONAL FREQUENCY DIVISION MULTIPLE ACCESS SHORT FRAME FORMAT

CROSS-REFERENCES TO RELATED APPLICATIONS

This application claims the benefit of U.S. Provisional Patent Application No. 62/088,008, entitled "BSS Identifier and OFDMA Short Frame Format" and filed on Dec. 5, 2014, U.S. Provisional Patent Application No. 62/112,967, entitled "BSS Identifier and OFDMA Short Frame Format" and filed on Feb. 6, 2015, U.S. Provisional Patent Application No. 62/140,393, entitled "BSS Identifier and OFDMA Short Frame Format" and filed on Mar. 30, 2015, and U.S. Provisional Patent Application No. 62/146,062, entitled "OFDMA Protection with Simultaneous CTS" and filed on Apr. 10, 2015, the disclosures of each of which are incorporated herein by reference in their entireties.

Additionally, this application is related to U.S. patent application Ser. No. 14/961,359, entitled "BASIC SERVICE SET COLOR IDENTIFIER," filed on the same day as the present application, the disclosure of which is incorporated herein by reference in its entirety.

FIELD OF THE DISCLOSURE

The present disclosure relates generally to communication networks and, more particularly, to wireless local area networks that utilize short frame formats.

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for transmitting an orthogonal frequency division multiple access (OFDMA) data unit includes allocating, by a first communication device, respective sub-channels of an orthogonal frequency division multiplexing (OFDM) communication channel to two or more second communication devices for simultaneous OFDM transmission to the two or more second communication devices. Allocating the respective sub-channels includes allocating i) a first sub-channel to a first one of the two or more second communication devices, and ii) a second sub-channel to a second one of the two or more second communication devices. The method also includes transmitting, by the first communication device and to the two or more second communication devices, indications of the respective sub-channels allocated to the two or more second communication devices. The method includes generating, by the first communication device for transmission to the first one of the two or more second communication devices, a medium access control (MAC) protocol data unit (MPDU) that omits i) a MAC address of the first communication device, and ii) a MAC address of the first one of the two or more second communication devices. The method also includes transmitting, by the first communication device, an orthogonal frequency division multiple access (OFDMA) data unit via the OFDM communication channel. The MPDU is included in a portion of the OFMDA data unit transmitted via the first sub-channel to the first one of the two or more second communication devices.

In another embodiment, a first communication device includes a network interface device having one or more integrated circuits. The one or more integrated circuits are configured to allocate respective sub-channels of an orthogonal frequency division multiplexing (OFDM) communication channel to two or more second communication devices for simultaneous OFDM transmission to the two or more second communication devices, including allocation of i) a first sub-channel to a first one of the two or more second communication devices, and ii) a second sub-channel to a second one of the two or more second communication devices. The one or more integrated circuits are configured to transmit, to the two or more second communication devices, indications of the respective sub-channels allocated to the two or more second communication devices. The one or more integrated circuits are configured to generate, for transmission to the first one of the two or more second communication devices, a medium access control (MAC) protocol data unit (MPDU) that omits i) a MAC address of the first communication device, and ii) a MAC address of the first one of the two or more second communication devices. The one or more integrated circuits are configured to transmit an orthogonal frequency division multiple access (OFDMA) data unit via the OFDM communication channel. The MPDU is included in a portion of the OFDMA data unit transmitted via the first sub-channel to the first one of the two or more second communication devices.

In yet another embodiment, a method for simultaneous communication with multiple communication devices in a wireless local area network includes receiving, at a first communication device and from a second communication device, a downlink orthogonal frequency division multiplexing (OFDM) data unit via an OFDM communication channel. The method includes identifying, by the first communication device, a sub-channel of the OFDM communication channel on which the downlink OFDM data unit was transmitted by the second communication device. The method also includes generating, by the first communication device in response to the downlink OFDM data unit, an uplink OFDM data unit to be transmitted via the sub-channel on which the downlink OFDM data unit was transmitted, including generating a medium access control (MAC) protocol data unit (MPDU) that omits i) a MAC address of the first communication device, and ii) a MAC address of the second communication device. The method includes transmitting the uplink OFDM data unit to the second communication device via the sub-channel on which the downlink OFDM data unit was transmitted.

In another embodiment, a first communication device includes a network interface device having one or more integrated circuits. The one or more integrated circuits are configured to receive, from a second communication device, a downlink orthogonal frequency division multiplexing (OFDM) data unit via an OFDM communication channel. The one or more integrated circuits are configured to identify a sub-channel of the OFDM communication channel on which the downlink OFDM data unit was transmitted by the second communication device. The one or more integrated circuits are configured to generate, in response to the downlink OFDM data unit, an uplink OFDM data unit to be transmitted via the sub-channel on which the downlink OFDM data unit was transmitted, including generation of a medium access control (MAC) protocol data unit (MPDU) that omits i) a MAC address of the first communication device, and ii) a MAC address of the second communication device. The one or more integrated circuits are configured to transmit the uplink OFDM data unit to the second communication device via the sub-channel on which the downlink OFDM data unit was transmitted.

BRIEF DESCRIPTION OF THE DRAWINGS

FIG. 3 is a diagram of another prior art data unit format.

FIG. 4 is a diagram of another prior art data unit format.

FIG. 5 is a diagram of another prior art data unit format.

FIG. 9A, FIG. 9B, FIG. 9C, and FIG. 9D are diagrams of frame control fields of MPDUs, according to various embodiments.

FIG. 10A and FIG. 10B are diagrams of MPDUs having a reduced length, according to various embodiments.

FIG. 16A, FIG. 16B, and FIG. 16C are diagrams of aggregate MPDUs having one or more control frames, according to various embodiments.

FIG. 17 is a diagram of a sequence of orthogonal frequency division multiple access (OFDMA) data units, according to an embodiment.

FIG. 18 is a diagram of another sequence of OFDMA data units, according to an embodiment.

FIG. 19A and FIG. 19B are diagrams of an MPDU having a reduced length, according to an embodiment.

DETAILED DESCRIPTION

In embodiments described below, a wireless network device such as an access point (AP) or client station (STA) of a wireless local area network (WLAN) generates an orthogonal frequency division multiplex (OFDM) data unit that includes a media access control (MAC) protocol data unit (MPDU) having a reduced length. The Institute for Electrical and Electronics Engineers (IEEE) 802.11a, 802.11b, 802.11g, 802.11n, 802.11ac, and 802.11ah protocols describe formats for MAC frames (i.e., MPDUs) having different numbers of fields and lengths. In some protocols, for example, IEEE 802.11ah, certain fields within an MPDU are omitted or compressed to provide a "short" MAC frame with a reduced length and thus reduced overhead.

In some embodiments and/or scenarios, an access point or client station transmits or receives an MPDU of an orthogonal frequency division multiple access (OFDMA) data unit via an OFDM communication channel. In general, an access point or other network device allocates or assigns radio resources of an OFDM communication channel to specific client stations or groups of client stations for data transfers using OFDMA. For example, the access point makes an allocation of one or more tones, tone blocks, or sub-channels of the OFDM communication channel to multiple client stations. In an embodiment, the access point transmits to the client stations a resource allocation message that indicates the allocation to each of the client stations. During a subsequent OFDMA data transfer, each of the client stations simultaneously transmits an OFDM data unit using its assigned sub-channels. Although the description herein is generally based on embodiments and scenarios utilizing OFDMA, the methods and techniques described are utilized with multi-user multiple input, multiple output (MU-MIMO) configurations where different client stations use different spatial streams to transmit and/or receive frames, in various embodiments and/or scenarios.

In some embodiments and/or scenarios, a first communication device, such as an access point or client station, generates a reduced length MPDU for an OFDMA data unit to be transmitted via an allocated sub-channel of an OFDM communication channel. The reduced length MPDU omits one or more fields and is transmitted via the allocated sub-channel. A second communication device that receives the reduced length MPDU via the allocated sub-channel determines at least some of the omitted fields based on the allocated sub-channel via which the reduced length MPDU was received. In some embodiments, the first communication device and the second communication device store or re-use information provided in, or determined from, a resource allocation message that indicates the allocated sub-channel.

Figure 1:
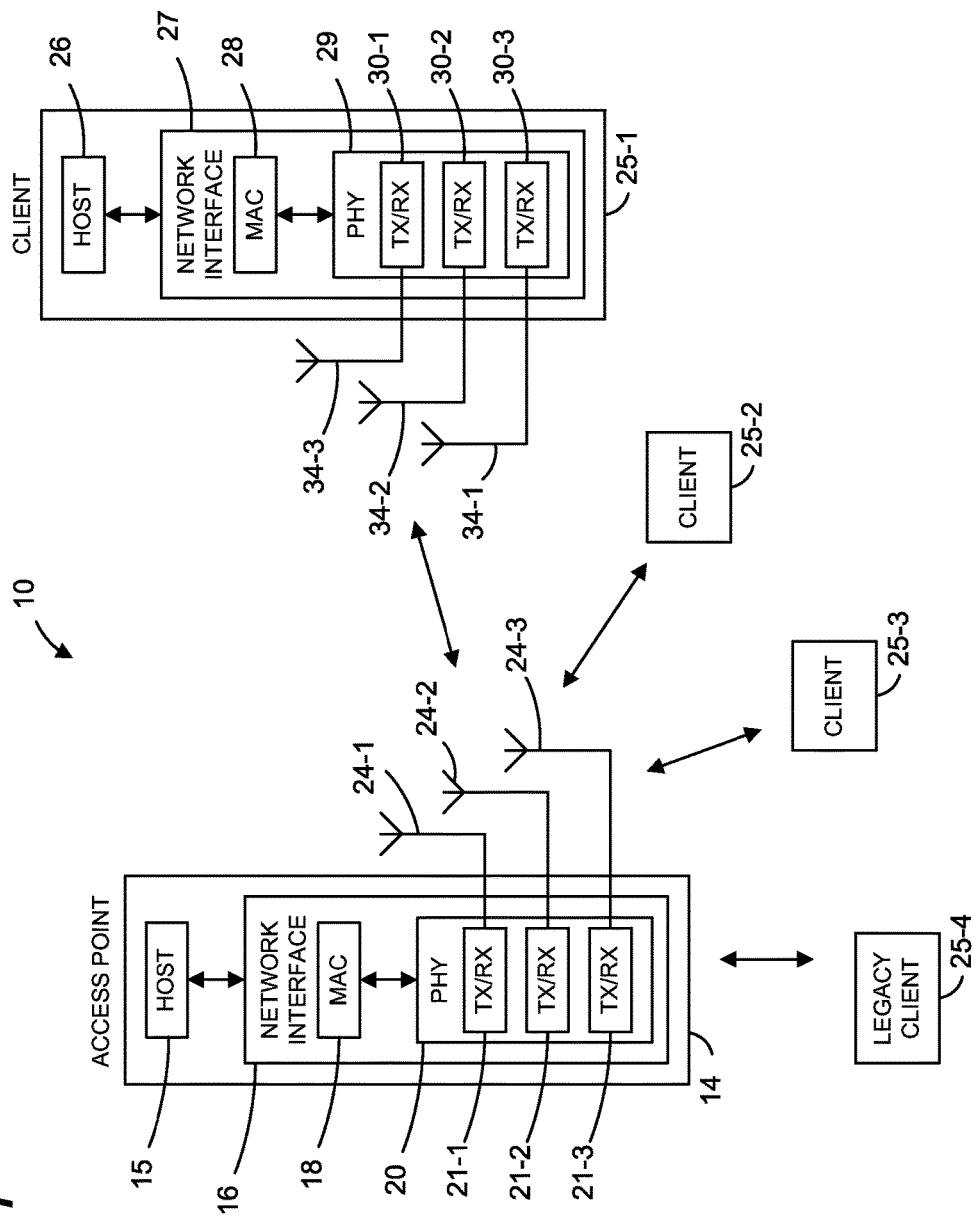
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the PHY processing unit 20 scrambles an MPDU (e.g., a PHY service data unit) based on a scramble seed.

In various embodiments, the MAC processing unit 18 and the PHY processing unit 20 are configured to operate according to a first communication protocol (e.g., a High Efficiency, HE, or 802.11ax communication protocol), including at least a first transmission mode and a second transmission mode of the first communication protocol. In some embodiments, the first transmission mode corresponds to a use of one or more reduced length MPDUs for transmission to and/or from an access point, while the second transmission mode corresponds to a use of a "full length" or default length MPDU for transmission to and/or from the access point. In an embodiment, for example, the MAC processing unit 18 omits one or more fields as compared to the full length MPDU to generate a reduced length MPDU. The reduced length MPDU is a control frame, a management frame, a data frame, or other suitable frame, in various embodiments and/or scenarios. In some embodiments, the full length frame is an IEEE 802.11ax compatible frame, an IEEE 802.11ac compatible frame, or other suitable frame. The first transmission mode is configured to reduce signaling overhead as compared to the second transmission mode. In some embodiments, the MAC processing unit 18 and the PHY processing unit 20 are also configured to operate according to a second communication protocol (e.g., according to the IEEE 802.11ac Standard). In yet another embodiment, the MAC processing unit 18 and the PHY processing unit 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In various embodiments and/or scenarios, the MAC processing unit 28 and the PHY processing unit 29 are configured to operate according to the first transmission mode and the second transmission mode, as described above with respect to the MAC processing unit 18 and the PHY processing unit 20. In an embodiment, for example, the MAC processing unit 28 omits one or more fields as compared to the full length MPDU to generate a reduced length MPDU.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processing unit 18 and the PHY processing unit 20 of the AP 14 are configured to generate data units conforming to the first communication protocol and having formats described herein. The transceiver(s) 21 is/are configured to transmit the generated data units via the antenna(s) 24. Similarly, the transceiver(s) 21 is/are configured to receive data units via the antenna(s) 24. The MAC processing unit 18 and the PHY processing unit 20 of the AP 14 are configured to process received data units conforming to the first communication protocol and having formats described hereinafter and to determine that such data units conform to the first communication protocol, according to various embodiments.

In various embodiments, the MAC processing unit 28 and the PHY processing unit 29 of the client device 25-1 are configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The MAC processing unit 28 and the PHY processing unit 29 of the client device 25-1 are configured to process received data units conforming to the first communication protocol and having formats described hereinafter and to determine that such data units conform to the first communication protocol, according to various embodiments.

In various embodiments, one or both of the AP 14 and the client device 25-1 are configured to receive OFDM data units that include reduced length MPDUs. In an embodiment, for example, the AP 14 maintains an association of a client station with an allocated sub-channel of the OFDM communication channel such that the AP 14 can generally identify which client station has transmitted an OFDM data unit based on the sub-channel on which the OFDM data unit was received. In another embodiment, the client station 25-1 maintains an association of the AP 14 with the allocated sub-channel such that the client station 25-1 can generally identify which AP has transmitted an OFDM data unit based on the sub-channel on which the OFDM data unit was received.

Figure 2A:
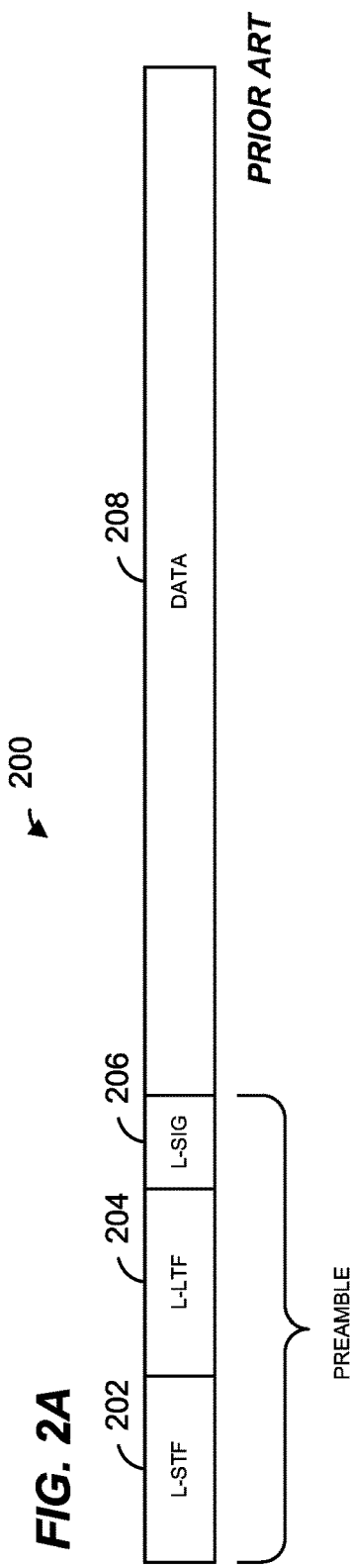
FIGS. 2A and 2B are diagrams of a prior art data unit format.
Figure 2B:
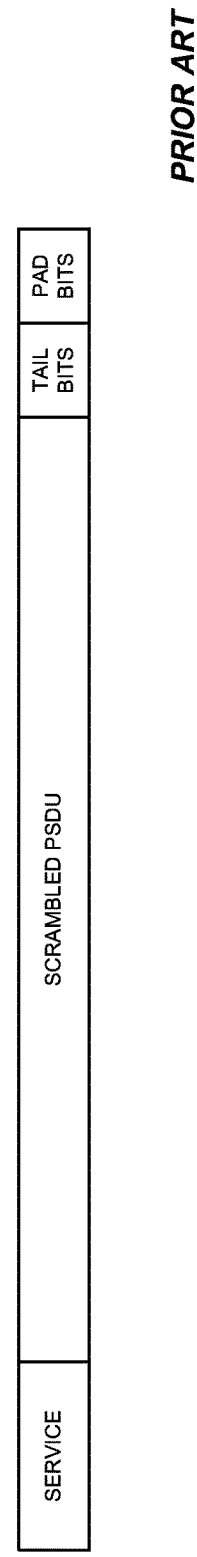

FIG. 2A is a diagram of a prior art orthogonal frequency division multiplexing (OFDM) data unit 200 that the AP 14 is configured to transmit to the legacy client station 25-4 via orthogonal frequency division multiplexing (OFDM) modulation, according to an embodiment. In an embodiment, the legacy client station 25-4 is also configured to transmit the data unit 200 to the AP 14. The data unit 200 conforms to the IEEE 802.11a Standard and occupies a 20 Megahertz (MHz) bandwidth. The data unit 200 includes a preamble having a legacy short training field (L-STF) 202, generally used for packet detection, initial synchronization, and automatic gain control, etc., and a legacy long training field (L-LTF) 204, generally used for channel estimation and fine synchronization. The data unit 200 also includes a legacy signal field (L-SIG) 206, used to carry certain physical layer (PHY) parameters with the data unit 200, such as modulation type and coding rate used to transmit the data unit, for example. The data unit 200 also includes a data portion 208. FIG. 2B is a diagram of example data portion 208 (not low density parity check encoded), which includes a service field, a scrambled physical layer service data unit (PSDU), tail bits, and padding bits, if needed. The data unit 200 is designed for transmission over one spatial or space-time stream in a single input single output (SISO) channel configuration. In various embodiments, the data portion 208 includes a MAC protocol data unit (MPDU), for example, the MPDU 700 (FIG. 7) or the MPDU 800 (FIG. 8).

FIG. 3 is a diagram of a prior art OFDM data unit 300 that the AP 14 is configured to transmit to the legacy client station 25-4 via OFDM modulation, according to an embodiment. In an embodiment, the legacy client station 25-4 is also configured to transmit the data unit 300 to the AP 14. The data unit 300 conforms to the IEEE 802.11n Standard, occupies a 20 MHz bandwidth, and is designed for mixed mode situations, i.e., when the WLAN includes one or more client stations that conform to the IEEE 802.11a Standard but not the IEEE 802.11n Standard. The data unit 300 includes a preamble having an L-STF 302, an L-LTF 304, an L-SIG 306, a high throughput signal field (HT-SIG) 308, a high throughput short training field (HT-STF) 310, and M data high throughput long training fields (HT-LTFs) 312, where M is an integer generally based on the number of spatial streams used to transmit the data unit 300 in a multiple input multiple output (MIMO) channel configuration. In particular, according to the IEEE 802.11n Standard, the data unit 300 includes two HT-LTFs 312 if the data unit 300 is transmitted using two spatial streams, and four HT-LTFs 312 is the data unit 300 is transmitted using three or four spatial streams. An indication of the particular number of spatial streams being utilized is included in the HT-SIG field 308. The data unit 300 also includes a data portion 314. In various embodiments, the data portion 314 includes an MPDU, for example, the MPDU 700 (FIG. 7) or the MPDU 800 (FIG. 8).

FIG. 4 is a diagram of a prior art OFDM data unit 400 that the AP 14 is configured to transmit to the legacy client station 25-4 via OFDM modulation, according to an embodiment. In an embodiment, the legacy client station 25-4 is also configured to transmit the data unit 400 to the AP 14. The data unit 400 conforms to the IEEE 802.11n Standard, occupies a 20 MHz bandwidth, and is designed for "Greenfield" situations, i.e., when the WLAN does not include any client stations that conform to the IEEE 802.11a Standard, and only includes client stations that conform to the IEEE 802.11n Standard. The data unit 400 includes a preamble having a high throughput Greenfield short training field (HT-GF-STF) 402, a first high throughput long training field (HT-LTF1) 404, a HT-SIG 406, and M data HT-LTFs 408. The data unit 400 also includes a data portion 410. In various embodiments, the data portion 410 includes an MPDU, for example, the MPDU 700 (FIG. 7) or the MPDU 800 (FIG. 8).

FIG. 5 is a diagram of a prior art OFDM data unit 500 that the AP 14 is configured to transmit to the legacy client station 25-4 via OFDM modulation, according to an embodiment. In an embodiment, the legacy client station 25-4 is also configured to transmit the data unit 500 to the AP 14. The data unit 500 conforms to the IEEE 802.11ac Standard and is designed for "Mixed field" situations. The data unit 500 occupies a 20 MHz bandwidth. In other embodiments or scenarios, a data unit similar to the data unit 500 occupies a different suitable bandwidth, such as a 40 MHz, an 80 MHz, or a 160 MHz bandwidth. The data unit 500 includes a preamble having an L-STF 502, an L-LTF 504, an L-SIG 506, two first very high throughput signal fields (VHT-SIGAs) 508 including a first very high throughput signal field (VHT-SIGA1) 508-1 and a second very high throughput signal field (VHT-SIGA2) 508-2, a very high throughput short training field (VHT-STF) 510, M very high throughput long training fields (VHT-LTFs) 512, and a second very high throughput signal field (VHT-SIG-B) 514. The data unit 500 also includes a data portion 516. In various embodiments, the data portion 516 includes an MPDU, for example, the MPDU 700 (FIG. 7) or the MPDU 800 (FIG. 8).

In an embodiment, the data unit 500 occupies a bandwidth that is an integer multiple of 20 MHz and the L-STF 502 is duplicated within each 20 MHz sub-band. In an embodiment, the VHT-STF 510 has a duration of 4.0 microseconds and uses a same frequency sequence as the L-STF 502. For example, in an embodiment, the VHT-STF 510 uses the frequency sequence defined in equation 22-29 of the IEEE 802.11ac standard. In at least some embodiments, the VHT-STF 510 occupies a whole bandwidth for the data unit 500 (e.g., 20 MHz, 40 MHz, 80 MHz, etc.) and is mapped to multiple antennas for multiple input, multiple output (MIMO) or beamforming in a manner similar to the data portion 516.

Figure 6:
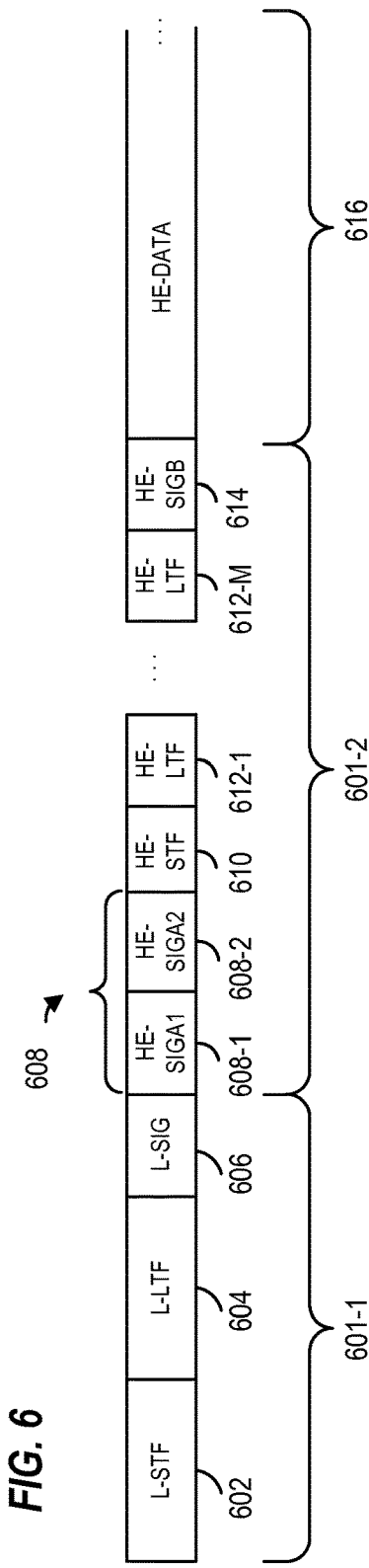
FIG. 6 is a diagram of an orthogonal frequency division multiplexing (OFDM) data unit, according to an embodiment.

FIG. 6 is a diagram of an OFDM data unit 600 that the AP 14 is configured to transmit to the client station 25-1 via orthogonal frequency domain multiplexing (OFDM) modulation, according to an embodiment. In an embodiment, the client station 25-1 is also configured to transmit the data unit 600 to the AP 14. The data unit 600 conforms to the first communication protocol and occupies a 20 MHz bandwidth. Data units that conform to the first communication protocol similar to the data unit 600 may occupy other suitable bandwidths such as 40 MHz, 80 MHz, 160 MHz, 320 MHz, 640 MHz, etc., for example, or other suitable bandwidths, in other embodiments. The data unit 600 is suitable for "mixed mode" situations, i.e., when the WLAN 10 includes a client station (e.g., the legacy client station 25-4) that conforms to a legacy communication protocol, but not the first communication protocol. The data unit 600 is utilized in other situations as well, in some embodiments.

In an embodiment, the data unit 600 includes a preamble 601 having an L-STF 602, an L-LTF 604, an L-SIG 606, two first HE signal fields (HE-SIGAs) 608 including a first HE signal field (HE-SIGA1) 608-1 and a second HE signal field (HE-SIGA2) 608-2, a HE short training field (HE-STF) 610, M HE long training fields (HE-LTFs) 612, and a third HE signal field (HE-SIGB) 614. In an embodiment, the preamble 601 includes a legacy portion 601-1, including the L-STF 602, the L-LTF 604, and the L-SIG 606, and a non-legacy portion 601-2, including the HE-SIGAs 608, HE-STF 610, M HE-LTFs 612, and HE-SIGB 614.

Each of the L-STF 602, the L-LTF 604, the L-SIG 606, the HE-SIGAs 608, the HE-STF 610, the M HE-LTFs 612, and the HE-SIGB 614 are included in an integer number of one or more OFDM symbols. For example, in an embodiment, the HE-SIGAs 608 correspond to two OFDM symbols, where the HE-SIGA1 608-1 field is included in the first OFDM symbol and the HE-SIGA2 is included in the second OFDM symbol. In another embodiment, for example, the preamble 601 includes a third HE signal field (HE-SIGA3, not shown) and the HE-SIGAs 608 correspond to three OFDM symbols, where the HE-SIGA1 608-1 field is included in the first OFDM symbol, the HE-SIGA2 is included in the second OFDM symbol, and the HE-SIGA3 is included in the third OFDM symbol. In at least some examples, the HE-SIGAs 608 are collectively referred to as a single HE signal field (HE-SIGA) 608. In some embodiments, the data unit 600 also includes a data portion 616. In other embodiments, the data unit 600 omits the data portion 616 (e.g., the data unit 600 is a null-data packet). In various embodiments, the data portion 616 includes an A-MPDU, an MPDU, for example, the MPDU 700 (FIG. 7) or the MPDU 800 (FIG. 8).

In the embodiment of FIG. 6, the data unit 600 includes one of each of the L-STF 602, the L-LTF 604, the L-SIG 606, and the HE-SIGA1s 608. In other embodiments in which an OFDM data unit similar to the data unit 600 occupies a cumulative bandwidth other than 20 MHz, each of the L-STF 602, the L-LTF 604, the L-SIG 606, the HE-SIGA1s 608 is repeated over a corresponding number of 20 MHz-wide sub-bands of the whole bandwidth of the data unit, in an embodiment. For example, in an embodiment, the OFDM data unit occupies an 80 MHz bandwidth and, accordingly, includes four of each of the L-STF 602, the L-LTF 604, the L-SIG 606, and the HE-SIGA1s 608 in four 20 MHz-wide sub-bands that cumulatively span the 80 MHz bandwidth, in an embodiment. In some embodiments, the modulation of different 20 MHz-wide sub-bands signals is rotated by different angles. For example, in one embodiment, a first sub-band is rotated 0-degrees, a second sub-band is rotated 90-degrees, a third sub-band is rotated 180-degrees, and a fourth sub-band is rotated 270-degrees. In other embodiments, different suitable rotations are utilized. The different phases of the 20 MHz-wide sub-band signals result in reduced peak to average power ratio (PAPR) of OFDM symbols in the data unit 600, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIGB and the HE data portion occupy the corresponding whole bandwidth of the data unit.

Figure 7:
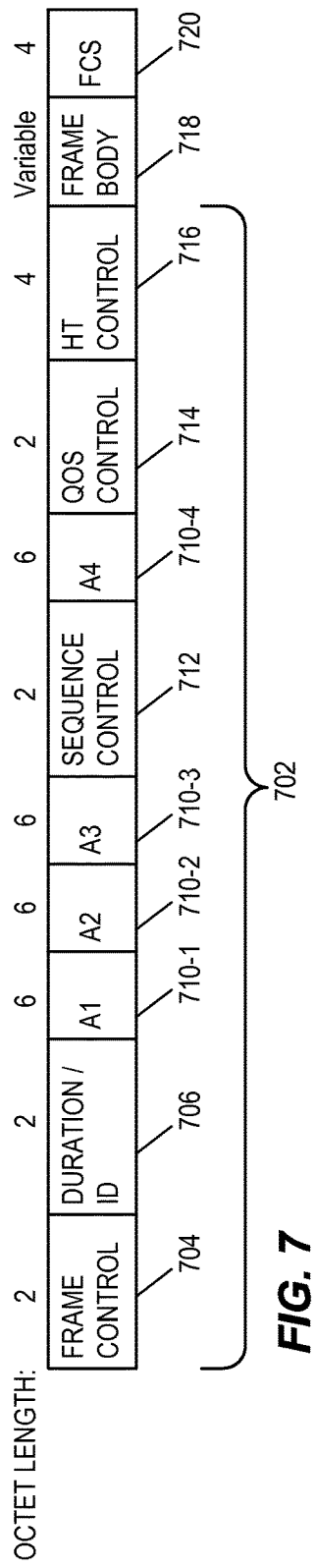
FIG. 7 is a diagram of a medium access control (MAC) protocol data unit (MPDU), according to an embodiment.
Figure 8:
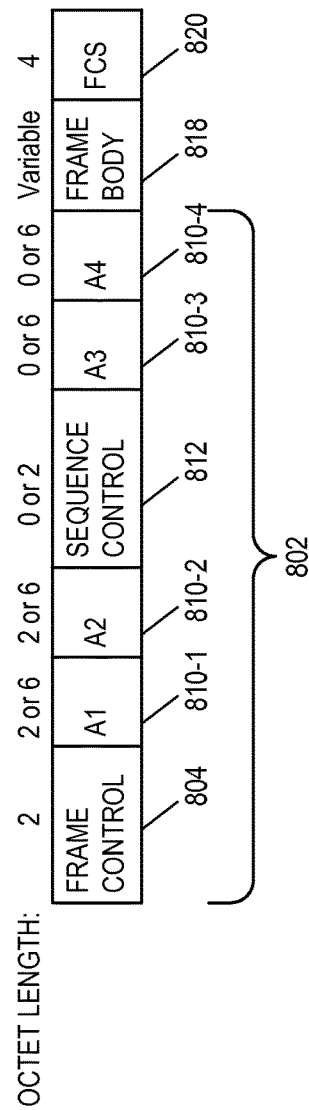
FIG. 8 is a diagram of an MPDU, according to another embodiment.

FIG. 7 is a diagram of an MPDU 700, according to an embodiment. The MPDU 700 includes a MAC header 702, a frame body 704, and a frame check sequence field 720. The number above each field in FIG. 7 indicates the number of octets occupied by the corresponding field. Accordingly, the MAC header 702 includes a frame control field 704 (2 octets), a duration/ID field 706 (2 octets), a first address (A1) field 710-1 (6 octets), a second address (A2) field 710-2 (6 octets), a third address (A3) field (6 octets) 710-3, a sequence control field 712 (2 octets), a fourth address (A4) field 710-4 (6 octets), a QoS control field 714 (2 octets), and an HT control field 716 (4 octets). The data unit 700 also includes the frame body 718 and a four-octet frame check sequence (FCS) field 720. In some embodiments and/or scenarios, the frame body 718 is omitted (e.g., a null data frame). Each of the address fields 710 is a 48 bit (6 octet) field that includes a globally unique MAC address of a device associated with the data unit 700, such as a transmitting device of the data unit 700, a receiving device of the data unit 700, etc. In general, the MAC header 702 occupies 36 octets of the MPDU 700.

FIG. 8 is a diagram of an MPDU 800, according to another embodiment. The MPDU 800 includes a MAC header 802, a frame body 804, and a frame check sequence field 806. The number above each field in FIG. 8 indicates the number of octets occupied by the corresponding field. Accordingly, the MAC header 802 includes a frame control field 804 (2 octets), a first address (A1) field 810-1 (2 or 6 octets), a second address (A2) field 810-2 (2 or 6 octets), a third address (A3) field (0 or 6 octets) 810-3, a sequence control field 812 (0 or 2 octets), and a fourth address (A4) field 810-4 (0 or 6 octets). The data unit 800 also includes the frame body 818 and a four-octet frame check sequence (FCS) field 820. In some embodiments and/or scenarios, the frame body 818 is omitted (e.g., a null data frame).

As compared to the MPDU 700, the MPDU 800 has a "short frame format" having a reduced length of the MAC header 802. In an embodiment, the MPDU 800 is similar to "short frames" as described in the IEEE 802.11ah protocol. In some embodiments and/or scenarios, one or more of the address fields 810-1 or 810-2 is a 48 bit (6 octet) field that includes a globally unique MAC address of a device associated with the data unit 800, such as a transmitting device of the data unit 800, a receiving device of the data unit 800, etc. In other embodiments and/or scenarios, one or more of the address fields 810-1 or 810-2 is a 16 bit (2 octet) field that includes a BSS color identifier, partial association identification (PAID or partial AID), or other suitable address having a reduced length as compared to a MAC address (i.e., less than 6 octets). In various embodiments, the BSS color identifier occupies 6 bits, 7 bits, 10 bits, or another suitable number of bits. In some embodiments and/or scenarios, one or more of the sequence control field 812, the address field 810-3, or the address field 810-4 are optional and omitted from the MAC header 802. In general, the MAC header 802 occupies 6 octets, or up to 28 octets, of the MPDU 800. In some embodiments or scenarios, the receiver address and transmitter address are omitted from the MAC header of the frame because, for example, in downlink OFDMA or downlink MU-MIMO frame exchanges, the PHY SIG includes i) a BSS color identifier that identifies the transmitter (e.g., the AP 14) and association identifiers (AIDs) that identify the receivers (e.g., client stations). In some embodiments or scenarios, the receiver address and transmitter address are omitted from the MAC header of the frame because, for example, in uplink OFDMA or uplink MU-MIMO frame exchanges, a trigger frame or scheduling frame that triggers the uplink frame exchange includes a BSSID that identifies the receiver (e.g., the AP 14) of the UL MU transmission and AIDs that identify the transmitters (e.g., client stations) of the UL MU transmission.

FIG. 9A, FIG. 9B, FIG. 9C, and FIG. 9D are diagrams of frame control fields 900, 925, 950, and 975 of MPDUs, according to various embodiments. The number above each field in FIGS. 9A, 9B, 9C, and 9D indicates the number of bits occupied by the corresponding field. The frame control field 900 corresponds to a control MPDU, in an embodiment. The frame control field 925 corresponds to a probe response MPDU, in an embodiment. The frame control field 950 corresponds to a resource allocation MPDU, in an embodiment. The frame control field 975 corresponds to a protocol version 1 ("PV1") frame.

The frame control field 900 includes a protocol version field 902 (2 bits), a type field 904 (3 bits), a partial traffic identifier (PTID)/subtype field 906 (3 bits), a bandwidth indication field 908 (3 bits), a dynamic indication field 910 (1 bit), a next target wake time (TWT) information present field 912 (1 bit), a more data field 914 (1 bit), a flow control field 916 (1 bit), and a reserved field 918 (1 bit), in an embodiment. In an embodiment, the frame control field 900 corresponds to the frame control field for short control frames as described in the IEEE 802.11ah protocol.

The frame control field 925 includes a protocol version field 926 (2 bits), a type field 928 (3 bits), a PTID/subtype field 930 (3 bits), a next target beacon transmission time (TBTT) present field 932 (1 bit), a full service set identifier (SSID) present field 934 (1 bit), an access network options (ANO) present field 936 (1 bit), a security field 940 (1 bit), and a primary channel field 942 (1 bit), in an embodiment. In an embodiment, the frame control field 925 corresponds to the frame control field for short probe response frames as described in the IEEE 802.11ah protocol.

The frame control field 950 includes a protocol version field 952 (2 bits), a type field 954 (3 bits), a PTID/subtype field 956 (3 bits), a slot assignment mode field 958 (1 bit), a more fragments field 960 (1 bit), a power management field 962 (1 bit), a group indicator field 964 (1 bit), a protected frame field 966 (1 bit), an end of service period field 968 (1 bit), a relayed frame field 970 (1 bit), and an acknowledgment policy field 972 (1 bit), in an embodiment.

The frame control field 975 includes a protocol version field 976 (2 bits), a type field 978 (3 bits), a PTID/subtype field 980 (3 bits), a from destination station (DS) field 982 (1 bit), a more fragments field 984 (1 bit), a power management field 986 (1 bit), a more data field 988 (1 bit), a protected frame field 990 (1 bit), an end of service period field 992 (1 bit), a relayed frame field 994 (1 bit), and an acknowledgment policy field 996 (1 bit), in an embodiment. In an embodiment, the frame control field 975 corresponds to the frame control field for short frames (except for the short frames described above) as described in the IEEE 802.11ah protocol.

In some embodiments, the AP 14 or client station 25 does not utilize or omits one or more types (e.g., a value of the type field), subtypes (e.g., a value of the PTID/subtype field), fields, or subfields of the frame control fields 900, 925, 950, and 975 to provide a reduced length of an MPDU. In some embodiments, the AP 14 or client station 25 repurposes a field that has not been utilized. In an embodiment, one of a type value of 0, corresponding to quality of service data frame, or a type value of 1, corresponding to a management frame, is not utilized. In an embodiment, a PTID/subtype value of 000, corresponding to a short target wake time acknowledgment (STACK) subtype, or a PTID/subtype value of 001, corresponding to a block acknowledgement target wake time (BAT), is not utilized. In an embodiment, the relayed frame field 970 or 994 is not utilized or omitted. In various embodiments, the bandwidth indication 908, dynamic indication 910, next TWT info present field 912, and the flow control field 916 are not utilized or omitted. In an embodiment, the AP 14 or client station 25 does not utilize or omits one or more of the next TBTT present field 932, the full SSID present field 934, the ANO present field 936, the security field 940, and the primary channel field 942. In an embodiment, the AP 14 or client station 25 does not utilize or omits one or more of the slot assignment mode field 958, the more fragments field 960, the power management field 962, the group indicator field 964, the protected frame field 966, the end of service period field 968, the relayed frame field 970, or the acknowledgment policy field 972.

FIG. 10A and FIG. 10B are diagrams of MPDUs 1000 and 1050 having a reduced length, according to various embodiments. The MPDU 1000 is a data frame, management frame, or other suitable frame, in various embodiments. The MPDU 1050 is a data frame, a management frame, or other suitable frame, in various embodiments. In some embodiments, the AP 14 generates the MPDU 1000 or the MPDU 1050 to be transmitted via an orthogonal frequency division multiple access (OFDMA) data unit or MU-MIMO data unit. In these embodiments, the AP 14 transmits resource allocation information prior to the MPDU 1000 or MPDU 1050. In an embodiment, the MPDU 1000 includes a MAC header 1001, a frame body 1010, and a frame check sequence field 1012. The number above each field in FIG. 10A indicates the number of octets occupied by the corresponding field. Accordingly, the MAC header 1001 includes a frame control field 1002 (2 octets), a duration field 1004 (2 octets), a sequence control field 1006 (2 octets), and a third address (A3) field (0 or 6 octets) 1008.

As compared to the MPDU 700, the MPDU 1000 has a short frame format in that the AP 14 or client station 25 omits the duration/ID field 706, the first address field 710-1, the second address field 710-2, the fourth address field 710-4, the QoS control field 714, and the HT control field 716. The receiver of the reduced length MPDU 1000 determines at least some of the omitted fields based on the allocated sub-channel via which the reduced length MPDU 1000 was received. In some embodiments, the AP 14 and/or client station 25 store or re-use information provided in, or determined from, the resource allocation information. The resource allocation information provides an indication of one or more sub-channels allocated for the OFDMA data unit. In an embodiment, for example, the AP 14 generates the HE signal field 608 which precedes the MPDU within the OFDMA data unit and indicates the resource allocation information. In another embodiment, for example, the AP 14 generates a scheduling frame, trigger frame, or SYNC frame that indicates the resource allocation information. In an embodiment, the resource allocation information identifies the AP 14 by a BSS color identifier or BSSID, which is either a transmitter for a downlink OFDMA data unit (i.e., the second address field 710-2) or a receiver for an uplink OFDMA data unit (i.e., the first address field 710-1). The sub-channel of the OFDMA data unit identifies the client station, which is either the receiver for a downlink OFDMA data unit (i.e., the first address field 710-1) or the transmitter of an uplink OFDMA data unit (i.e., the second address field 710-2). The fourth address field 710-4 is not needed because OFDMA data units are transmitted directly from an AP to a client station, or directly from a client station to an AP. In some embodiments, the third address field 710-3, shown as third address field 1008 is a source MAC address for a downlink transmission or a destination MAC address for an uplink transmission. The third address field 1008 is optionally omitted, in various embodiments and/or scenarios. In an embodiment, for example, the third address field 1008 is omitted after a negotiation between the AP and client station where the AP and client station agree to buffer the value of the third address field 1008, thus allowing for its omission (i.e., a bit length of 0 as shown in FIG. 10A).

In an embodiment, the MPDU 1050 includes a MAC header 1051, a frame body 1058, and a frame check sequence field 1060. The number above each field in FIG. 10B indicates the number of octets occupied by the corresponding field. Accordingly, the MPDU 1050 includes a frame control field 1052 (2 octets), a sequence control field 1054 (2 octets), and a third address (A3) field (0 or 6 octets)

1056 that form a MAC header of the MPDU 1050. The MPDU 1050 is generally similar to the MPDU 1000, but the AP 14 or client station 25 omits the duration field 1004 from the MPDU 1050. In an embodiment, for example, the AP 14 includes a transmission opportunity (TXOP) duration in the HE signal field 608, which allows for the omission of the duration field 1004 from the MPDU 1050.

Figure 11A:
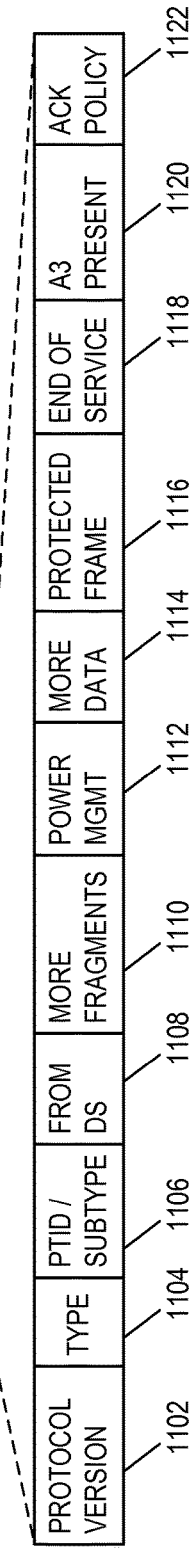
FIG. 11A and FIG. 11B are diagrams of frame control fields for MPDUs having a reduced length, according to various embodiments.
Figure 11B:
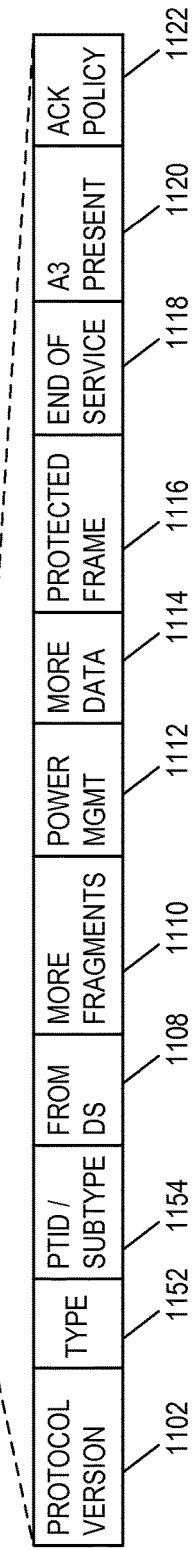

FIG. 11A and FIG. 11B are diagrams of frame control fields for MPDUs 1100 and 1150 having a reduced length, according to various embodiments. In an embodiment, the MPDU 1100 is a data frame, management frame, or other suitable frame that is similar to the frame 1050. Accordingly, the MPDU 1100 includes the frame control field 1052, the sequence control field 1054, optionally the third address field 1056, the frame body 1058, and the frame check sequence field 1060. In another embodiment, the MPDU 1100 is similar to the frame 1000 and also includes a duration field (e.g., the duration field 1004). The frame control field 1052 of the MPDU 1100 includes a protocol version field 1102 (2 bits), a type field 1104 (3 bits), a PTID/subtype field 1106 (3 bits), a from destination station (DS) field 1108 (1 bit), a more fragments field 1108 (1 bit), a power management field 1112 (1 bit), a more data field 1114 (1 bit), a protected frame field 1116 (1 bit), an end of service period field 1118 (1 bit), an A3 present field 1120 (1 bit), and an acknowledgment policy field 1122 (1 bit), in an embodiment. As compared to the frame control field 975, the AP 14 repurposes the relayed frame field 994 to include the A3 present field 1120, which provides an indication of whether the third address field 1056 has been omitted. For example, the AP 14 selects a value of "1" if the A3 field 1056 is present and selects a value of "0" of the A3 field 1056 is omitted (e.g., has a length of 0). In another embodiment, the A3 field 1056 is always included in the frame and the A3 present field 1120 is used to indicate an acknowledgment policy, thus two bits in the frame control field 1052 are used to indicate the acknowledgment policy.

In an embodiment, the MPDU 1150 is a data frame, management frame, or other suitable frame that is similar to the frame 1050. Accordingly, the MPDU 1150 includes the frame control field 1052, the sequence control field 1054, the third address (A3) field 1056, the frame body 1058, and the frame check sequence field 1060. In another embodiment, the MPDU 1100 is similar to the frame 1000 and also includes a duration field (e.g., the duration field 1004). The frame control field 1052 of the MPDU 1150 is similar to the frame control field 1052 of the MPDU 1100, but includes a type field 1152 and PTID/subtype field 1154. In an embodiment, the type field 1152 includes a value that indicates that the frame body 1058 includes an aggregate MSDU. In another embodiment, the PTID/subtype field 1154 includes a value that indicates that the frame body 1058 includes an aggregate MSDU. In another embodiment, the A3 field 1056 is always included in the frame and the A3 present field 1120 is used to indicate an acknowledgment policy, thus two bits in the frame control field 1052 are used to indicate the acknowledgment policy.

Figure 12A:
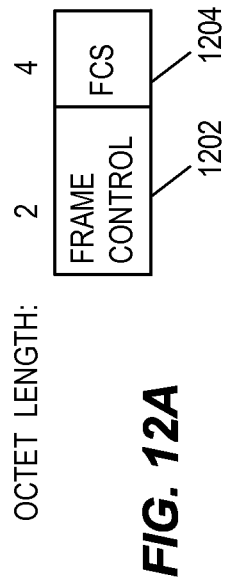
FIG. 12A and FIG. 12B are diagrams of MPDUs having a reduced length, according to various embodiments.
Figure 12B:
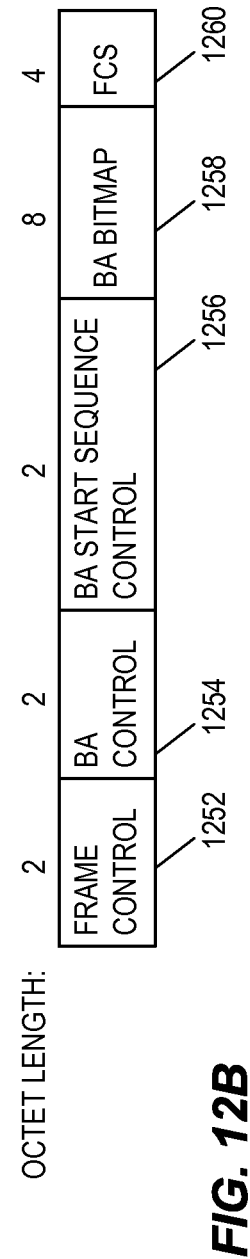

FIG. 12A and FIG. 12B are diagrams of MPDUs 1200 and 1250 having a reduced length, according to various embodiments. In an embodiment, the MPDU 1200 is a control frame that indicates a short acknowledgement to a received data unit. The MPDU 1200 includes a frame control field 1202 (2 octets) that forms a MAC header and a frame check sequence field 1204 (4 octets), in an embodiment. In a similar manner as described above with respect to the MPDU 1000 and MPDU 1050, the AP or client station omits the duration/ID field 706, the first address field 710-1, and the second address field 710-2 from the MPDU 1200 by utilizing the resource allocation information and sub-channel on which the MPDU is transmitted.

In an embodiment, the MPDU 1250 is a control frame that indicates a short block acknowledgement to a received data unit. The MPDU 1250 includes a frame control field 1252 (2 octets), a block acknowledgment control field 1254 (2 octets), a block acknowledgment start sequence control field 1256 (2 octets), a block acknowledgment bitmap 1258 (8 octets), and a frame check sequence field 1260 (4 octets), in an embodiment. In some embodiments, the block acknowledgment bitmap 1258 has a variable octet length. In a similar manner as described above with respect to the MPDU 1000 and MPDU 1050, the AP or client station omits the duration/ID field 706, the first address field 710-1, and the second address field 710-2 from the MPDU 1250 by utilizing the resource allocation information and sub-channel on which the MPDU is transmitted.

Figure 13:
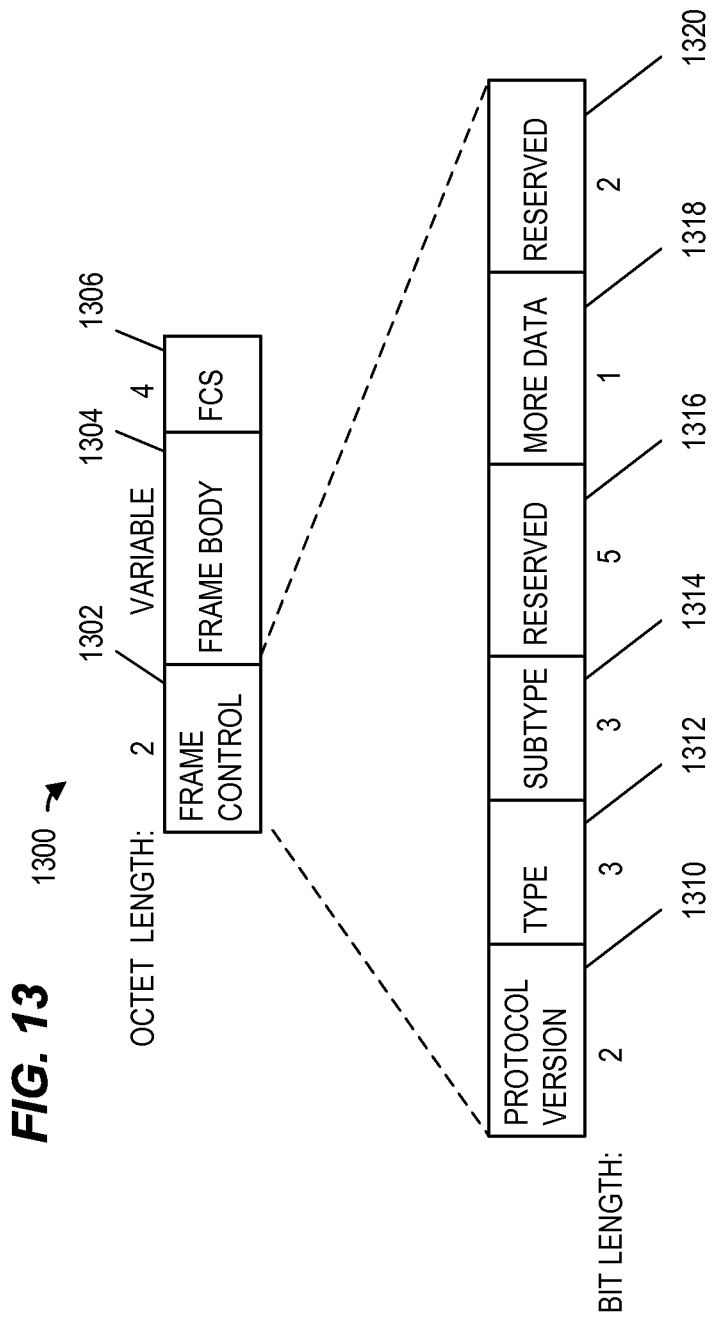
FIG. 13 is a diagram of another MPDU having a reduced length, according to an embodiment.

FIG. 13 is a diagram of a frame control field for an MPDU 1300 having a reduced length, according to an embodiment. The MPDU 1300 is a control frame or other suitable frame, in various embodiments. The MPDU 1300 includes a frame control field 1302 (2 octets), a frame body 1304 (variable octet length, including 0), and a frame check sequence field 1306 (4 octets). The frame control field 1302 is similar to the frame control field 900, but the AP 14 does not utilize the bandwidth indication field 908, the dynamic indication field 910, the next TWT information present field 912, the flow control field 916, or the reserved field 918, in an embodiment. Accordingly, the frame control field 1302 includes a protocol version field 1310 (2 bits), a type field 1312 (3 bits), a subtype field 1314 (3 bits), a first reserved field 1316 (5 bits), a more data field 1318 (1 bit), and a second reserved field 1320 (2 bits). In a similar manner as described above with respect to the MPDU 1000 and MPDU 1050, the AP or client station omits the duration/ID field 706, the first address field 710-1, and the second address field 710-2 from the MPDU 1300 by utilizing the resource allocation information and sub-channel on which the MPDU is transmitted. In some embodiments, the MPDU 1300 is a power save poll (PS-poll) frame which includes an association identifier (AID, not shown). In one such embodiment, the client station inserts the AID in the frame body 1304.

In some embodiments and/or scenarios, the resource allocation information and sub-channel on which the MPDU is transmitted are not unique, for example, where multiple neighbor BSSs have a same value of a BSS color identifier. If, for example, one client station doesn't respond with an acknowledgement in its UL OFDMA sub-channel, an acknowledgement in its adjacent sub-channel may leak to the UL OFDMA sub-channel. In an embodiment, when a transmitter generates a responding acknowledgement frame (e.g., Ack or Block Ack) that omits the MAC addresses as described herein, a scramble seed of the frame that elicits the acknowledgement frame is used as the scramble seed of the acknowledgement frame. When the receiver (e.g., AP or client station) receives the acknowledgement frame, the receiver utilizes the scramble seed of the eliciting frame to determine whether the acknowledgement frame is intended for the receiver. In another embodiment, the receiver address (RA) and the transmitter address (TA) are added when determining a value for the frame check sequence field for short Ack and short BA, even though the short Ack and short BA omit the RA and TA fields. In an embodiment, the RA and the TA are added when determining a value for the frame check sequence field for short data frames or short management frames, even though the short data frame and short management frame omit the RA and TA fields.

Figure 14:
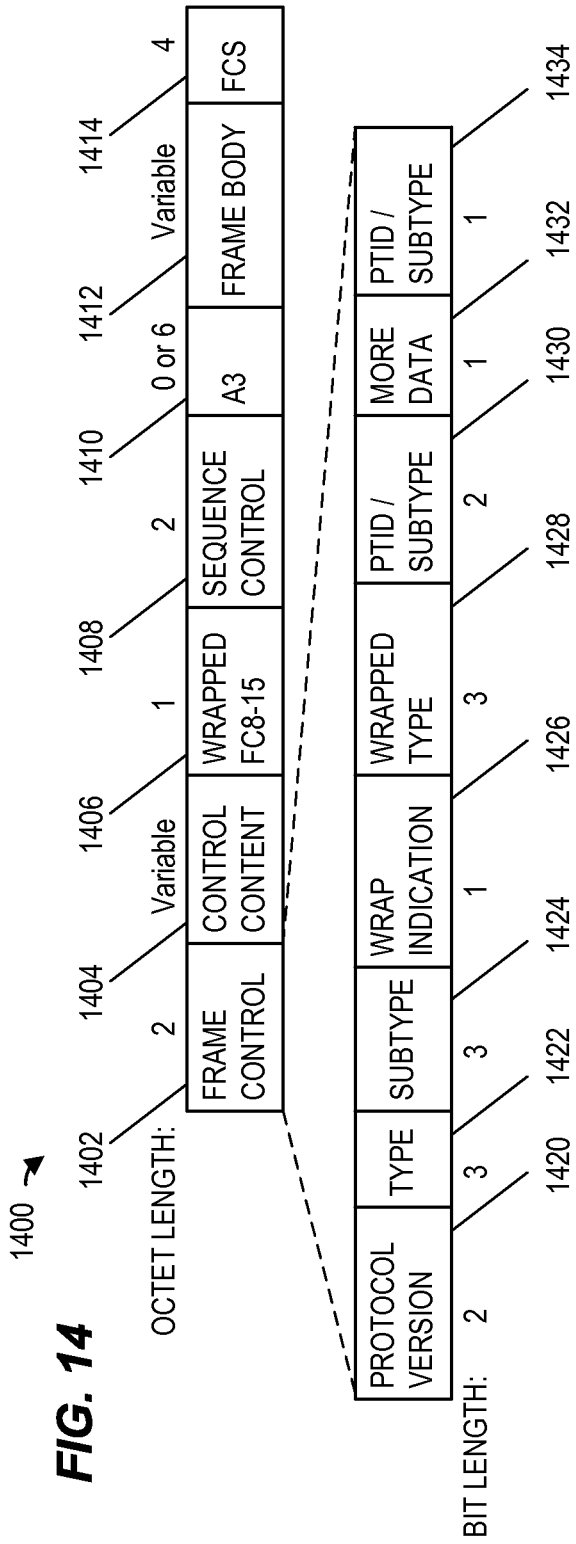
FIG. 14 is a diagram of a first MPDU that wraps a second MPDU, according to an embodiment.

FIG. 14 is a diagram of a first MPDU that wraps a second MPDU, according to an embodiment. In various embodiments, a first control frame wraps a second control frame, a data frame, or a management frame. In some embodiments, the AP or client station omits an A-MPDU delimiter, a frame check sequence field, or both the A-MPDU and frame check sequence field when wrapping a second frame. A combined MPDU 1400 includes a frame control field 1402 (2 octets), a control content field 1404 (variable length), a partial frame control field 1406 (1 octet), a sequence control field 1408 (2 octets), a third address field 1410 (0 or 6 octets), a frame body 1412 (variable length), and a frame check sequence 1414 (4 octets), in an embodiment. The frame control field 1402 includes a protocol version field 1420 (2 bits), a type field 1422 (3 bits), a subtype field 1424 (3 bits), a wrap indication field 1426 (1 bit), a wrapped type field 1428 (3 bits), a first PTID/subtype field 1430, a more data field 1432 (1 bit), and a second PTID/subtype field 1434 (1 bit).

In an embodiment, the type field 1422 and subtype field 1424 correspond to the first MPDU (i.e., a control frame) of the combined MPDU 1400 and the control content field 1404 includes a frame body of the first MPDU, while the wrapped type field 1428 and the first and second PTID/ subtype fields 1430 and 1434 (providing a combined field of 3 bits) correspond to the second MPDU and the frame body field 1412 includes the frame body of the second MPDU. In an embodiment, the wrap indication field 1426 indicates whether the second frame is a control frame, or a data/ management frame. For example, when the wrap indication field 1426 is a "1," then the second frame is a data frame or management frame and when the wrap indication field 1426 is a "0," then the second frame is a control frame. In another embodiment, the wrap indication field 1426 indicates whether the second frame is present (i.e., whether a wrapped frame is present). For example, when the wrap indication field 1426 is a "1," then a wrapped control frame is present and when the wrap indication field 1426 is a "0," then a wrapped control frame is not present. In an embodiment, the partial frame control field 1406 includes only 8 bits (e.g., the upper 8 bits thus excluding the protocol version, type, and subtype fields) of a frame control field for the second MPDU of the combined MPDU 1400.

In another embodiment, the frame control field 1402 is similar to the frame control field 1302. For example, in an embodiment, the reserved field 1316 is repurposed to include the wrap indication field 1426, the wrapped type field 1428, and one bit of the PTID/subtype field for the wrapped frame, while the reserved field 1320 is repurposed to include the second and third bits of the PTID/subtype field for the wrapped frame.

Figure 15A:
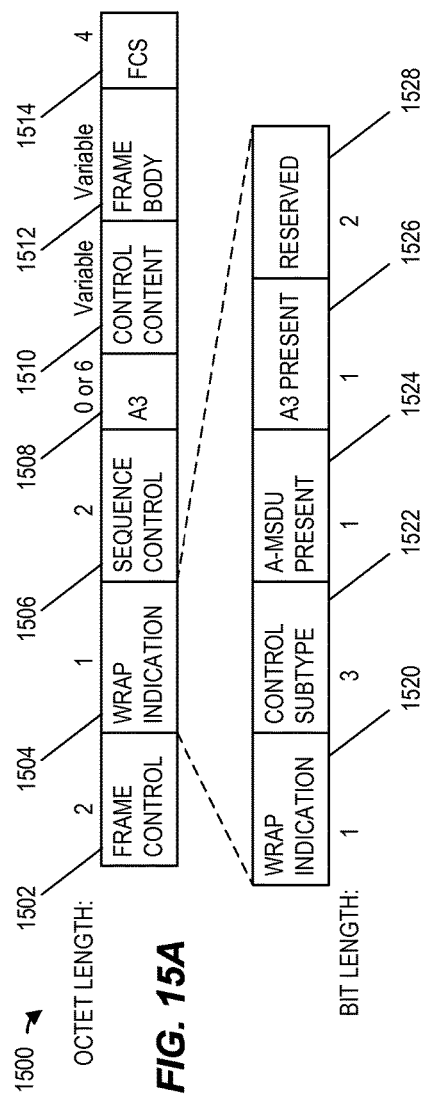
FIG. 15A and FIG. 15B are diagrams of a first MPDU that wraps a second MPDU, according to various embodiments.
Figure 15B:
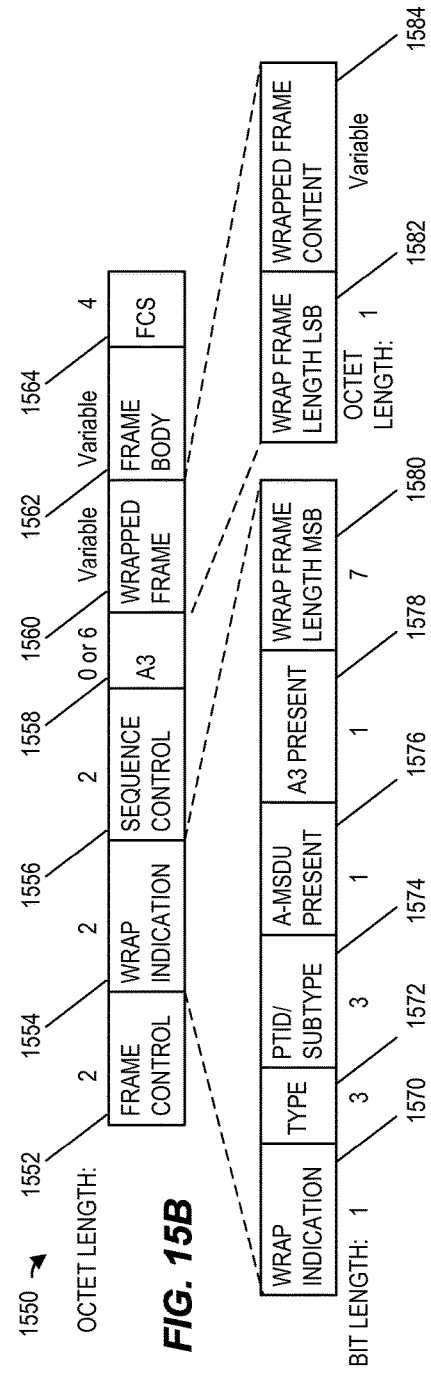

FIG. 15A and FIG. 15B are diagrams of combined MPDUs 1500 and 1550 having a first MPDU that wraps a second MPDU, according to various embodiments. In various embodiments, a first control frame wraps a second control frame, a data frame, or a management frame. In some embodiments, the AP or client station omits an A-MPDU delimiter, a frame check sequence field, or both the A-MPDU and frame check sequence field when wrapping a second frame. The combined MPDU 1500 includes a frame control field 1502 (2 octets), a first wrap indication field 1504 (1 octet), a sequence control field 1506 (2 octets), a third address field 1508 (0 or 6 octets), a control content field 1510 (variable length), a frame body 1512 (variable length), and a frame check sequence 1514 (4 octets), in an embodiment. The first wrap indication field 1504 includes a second wrap indication field 1520 (1 bit), a control subtype field 1522 (3 bits), an A-MSDU present field 1524 (1 bit), an A3 present subfield 1526 (1 bit), and a reserved field 1528 (2 bits). The A-MSDU present field 1524 indicates whether an aggregate MSDU is present in the frame body field 1512. In an embodiment, for example, a value of "1" in the A-MSDU present field 1524 indicates that an A-MSDU is present within the frame body field 1512 while a value of "0" indicates that a non-aggregate MSDU is present within the frame body field 1512. The A3 present subfield 1526 indicates whether the third address field 1508 is present in a manner similar to the A3 present subfield 1120.

In an embodiment, the second wrap indication field 1520 indicates whether the second frame is a control frame, a data frame, or a management frame. For example, when the second wrap indication field 1520 is a "1," then the second frame is a data frame or management frame and when the second wrap indication field 1520 is a "0," then the second frame is a control frame. In another embodiment, the second wrap indication field 1520 indicates whether the second frame is present (i.e., whether a wrapped frame is present). For example, when the second wrap indication field 1520 is a "1," then a wrapped control frame is present and when the second wrap indication field 1520 is a "0," then a wrapped control frame is not present.

In an embodiment, the control content field 1510 includes a frame body of the wrapped control frame. In an embodiment, the combined MPDU 1500 does not include a type field for the wrapped control frame because the type (i.e., a control type) is inherent in the indication of the wrapped frame (i.e., a wrapped control frame). Accordingly, the first wrap indication field 1504 includes the control subtype field 1522 but omits a type field. In an embodiment, the first wrap indication field 1504 has a length of two octets and the reserved field 1528 has a length of 10 bits.

The combined MPDU 1550 includes a frame control field 1552 (2 octets), a first wrap indication field 1554 (2 octets), a sequence control field 1556 (2 octets), a third address field 1558 (0 or 6 octets), a wrapped frame field 1560 (variable length), a frame body 1562 (variable length), and a frame check sequence 1564 (4 octets), in an embodiment. The first wrap indication field 1554 includes a second wrap indication field 1570 (1 bit), a type field 1572 (3 bits), a PTID/subtype field 1574 (3 bits), an A-MSDU present field 1576 (1 bit), an A3 present subfield 1578 (1 bit), and a first length field 1580 (7 bits). The wrapped frame field 1560 includes a second length field 1582 (1 octet) and a wrapped frame content field 1584 (variable length). The A-MSDU present field 1576 indicates whether an aggregate MSDU is present in the frame body field 1562. In an embodiment, for example, a value of "1" in the A-MSDU present field 1576 indicates that an A-MSDU is present within the frame body field 1562 while a value of "0" indicates that a non-aggregate MSDU is present within the frame body field 1562. The A3 present subfield 1578 indicates whether the third address field 1558 is present in a manner similar to the A3 present subfield 1120.

In an embodiment, the second wrap indication field 1570 indicates whether the second frame is a control frame. For example, when the second wrap indication field 1570 is a "1," then the second frame is a data frame or management frame and when the second wrap indication field 1570 is a "0," then the second frame is a control frame. In another embodiment, the second wrap indication field 1570 indicates whether the second frame is present (i.e., whether a wrapped frame is present). For example, when the second wrap indication field 1570 is a "1," then a wrapped control frame is present and when the second wrap indication field 1570 is a "0," then a wrapped control frame is not present.

In an embodiment, the type field 1572 and the PTID/subtype field 1574 correspond to the wrapped frame. In an embodiment, the first length field 1580 and the second length field 1582 indicate a length of the wrapped frame field 1560. For example, the first length field 1580 indicates a most significant portion (e.g., an upper seven bits) of a length value for the wrapped frame field 1560 and the second length field 1582 indicates a least significant portion (e.g., a lower eight bits) of a length value for the wrapped frame field 1560.

Similar to the VHT PPDU (e.g., the OFDM data unit 500), the PHY preamble of an HE data unit (e.g., the preamble 601 of the data unit 600) does not include an indication of a length in bytes of the corresponding PSDU (i.e., the PPDU data part). In an embodiment, an MPDU delimiter is utilized to indicate the length of an MPDU when the HE PPDU includes a single MPDU. FIG. 16A, FIG. 16B, and FIG. 16C are diagrams of aggregate MPDUs 1600, 1625, and 1650 having one or more control frames, according to various embodiments. In some embodiments, the AP 14 or client station 25 generate and transmit one or more of the A-MPDUs 1600, 1625, or 1650 via an OFDMA data unit. In some embodiments, the AP 14 or client station 25 combines one or more control frames to form an aggregate MPDU (A-MPDU). In an embodiment, the AP 14 or client station 25 combines control frames in an A-MPDU only with other control frames, thus the A-MPDU does not include a data frame. In other words, other frame types are not combined with control frames within an A-MPDU.

In an embodiment, the AP 14 or client station 25 generate an A-MPDU 1600 having a single control frame. The A-MPDU 1600 includes an MPDU delimiter 1602, a control frame 1604, and a suitable amount of padding 1606, in an embodiment. In another embodiment, the AP 14 or client station 25 generates an A-MPDU having multiple control frames, for example, the A-MPDUs 1625 or 1650. The A-MPDU 1625 includes a first MPDU delimiter 1625, a first control frame 1628, a first padding portion 1630, a second MPDU delimiter 1632, a second control frame 1634, and a second padding portion 1636, in an embodiment. The A-MPDU 1650 includes a first MPDU delimiter 1652, a first control frame 1654, a first padding portion 1656, a second MPDU delimiter 1658, a second control frame 1660, and a second padding portion 1662.

The MPDU delimiters 1602, 1626, 1632, 1652, and 1658 include a length indicator that corresponds to the control frame following the MPDU delimiter and an end of frame (EOF) indicator, in an embodiment. In some embodiments, the EOF indicator has a value of "0" for a normal A-MPDU delimiter and a value of "1" for an end of frame A-MPDU delimiter. In the embodiment shown in FIG. 16A, the control frame 1604 is an acknowledgment frames, the EOF indicator of the MPDU delimiter 1602 has a value of "0," and the length indicator of the MPDU delimiter 1602 indicates a non-zero length of the control frame 1604. In other embodiments, the control frame 1604 is a PS-poll frame, a block acknowledgment frame, or other suitable control frame. In the embodiment shown in FIG. 16B, the first control frame 1628 is an acknowledgment frame, the EOF indicator of the first MPDU delimiter 1626 has a value of "0," the length indicator of the first MPDU delimiter 1626 indicates a non-zero length of the first control frame 1628, the second control frame 1634 is a resource request frame, the EOF indicator of the second MPDU delimiter 1632 has a value of "0," and the length indicator of the second MPDU delimiter 1632 indicates a non-zero length of the second control frame 1634. In the embodiment shown in FIG. 16C, the first control frame 1654 is an acknowledgment frame, the EOF indicator of the first MPDU delimiter 1652 has a value of "0," the length indicator of the first MPDU delimiter 1652 indicates a non-zero length of the first control frame 1654, the second control frame 1660 is a scheduling or SYNC frame, the EOF indicator of the second MPDU delimiter 1658 has a value of "0," and the length indicator of the second MPDU delimiter 1658 indicates a non-zero length of the second control frame 1660. While only A-MPDUs having one or two control frames have been shown, the AP 14 or client station 25 generates an A-MPDU having three, four, or another suitable number of control frames, in various embodiments and/or scenarios.

FIG. 17 is a diagram of a sequence 1700 of an OFDMA frame exchange, according to an embodiment. The sequence 1700 includes downlink OFDMA data units 1702, 1706, and 1710, which are transmitted by the AP 14 to multiple client stations (e.g., client stations STA0, STA1, and STA2), and also includes uplink OFDMA data units 1704 and 1712, which are transmitted by the multiple client stations 25 (e.g., client stations STA0, STA1, and STA2) to the AP 14 in response to the downlink OFDMA data units 1702 and 1710, in an embodiment. In an embodiment, the OFDMA data unit 1712 includes the A-MPDU 1600. In this embodiment, the control frame 1604 corresponds to an acknowledgment of the OFDMA data unit 1710. In another embodiment, the downlink OFDMA data units 1702 and 1706 are downlink legacy data units (e.g., data unit 200, 300, 400, or 500).

In an embodiment, the OFDMA data unit 1702 includes the A-MPDU 1650. In this embodiment, the first control frame 1654 corresponds to an acknowledgment of a frame (not shown) previously received by the AP 14 and the second control frame 1660 corresponds to a scheduling frame (SYNC) for the multiple client stations. In an embodiment, the scheduling frame is a resource allocation message that indicates an allocation of sub-channels to each of the multiple client stations, in a similar manner as described above with respect to FIGS. 10A and 10B. In response to the scheduling frame, each of the multiple client stations STA0, STA1, and STA2 transmits an OFDM data unit 1704-1, 1704-2, and 1704-3, respectively, via sub-channels indicated in the scheduling frame. The AP 14 transmits the OFDMA data unit 1706 in response to the OFDMA data unit 1704 to acknowledge receipt, in an embodiment. In an embodiment, for example, the AP 14 generates the OFDMA data unit 1706 to include a short block acknowledgement, for example, the MPDU 1250, for each of the client stations STA0, STA1, and STA2.

FIG. 18 is a diagram of a sequence 1800 of an OFDMA frame exchange, according to an embodiment. The sequence 1800 includes a downlink OFDMA data unit 1802 which is generated and transmitted by the AP 14 to multiple client stations (e.g., client stations STA1, STA2, and STA3), and also includes uplink OFDMA data unit 1804, which is transmitted by the multiple client stations 25 (e.g., client stations STA1, STA2, and STA3) to the AP 14 in response to the downlink OFDMA data unit 1802, in an embodiment. In an embodiment, the OFDMA data unit 1802 includes the A-MPDU 1650 and the OFDMA data unit 1804 includes the A-MPDU 1600. In this embodiment, the control frame 1604 of the OFDMA data unit 1804 corresponds to an acknowledgment or block acknowledgment of the OFDMA data unit 1802. In some embodiments, the OFDMA data units 1802 and 1804 have relatively narrow sub-channels allocated to the multiple client stations. In an embodiment, for example, a sub-channel that includes only 26 tones, which carries 12 bits in each OFDM symbol, is allocated to a client station. In some embodiments, an extended interframe space (EIFS) is a duration of time after a data unit has been transmitted during which an acknowledgment frame to the data unit can be transmitted and protected from interference. For example, other client stations will wait for the duration of the EIFS before attempting to access the communication channel to allow a receiving client station to reply with the acknowledgment frame. In one such embodiment having only 26 allocated tones, the EIFS after the transmission of the OFDMA data unit 1802 is not sufficiently long to provide suitable protection from interference to an acknowledgment. In this embodiment, the client station 25 omits the A-MPDU delimiter from the OFDMA data unit 1804 to reduce its length so that the OFDMA data unit 1804 fits within and is protected by the EIFS. In some embodiments, the client station 25 omits the A-MPDU delimiter in response to the MPDU 1650. In some embodiments, the client station 25 or AP 14 omits the A-MPDU delimiter for acknowledgement frames, block acknowledgment frames, frames having a predetermined length, or other suitable frames.

FIG. 19A and FIG. 19B are diagrams of an MPDU 1900 having a reduced length, according to various embodiments. In some embodiments and/or scenarios, the MPDU 1900 includes resource request information that indicates uplink buffer information corresponding to frames that are queued for transmission. In other embodiments and/or scenarios, the MPDU 1900 includes resource request information that indicates a request for a transmission opportunity (TXOP) having an indicated duration, in an embodiment. The client station 25 generates and transmits the MPDU 1900 to request one or more sub-channels for an uplink data transfer, in an embodiment.

In some embodiments, the MPDU 1900 is a Quality of Service (QoS) Null frame having a reduced length. In an embodiment, the MPDU 1900 includes a frame control field 1902, a sequence control/resource request field 1904, and a frame check sequence field 1906. In an embodiment, the MPDU 1900 is similar to the MPDU 1150 described above with respect to FIG. 11B but omits the third address field 1056 and the frame body 1058. In this embodiment, the frame control field 1902 of the MPDU 1900 includes a protocol version field 1910 (2 bits), a type field 1912 (3 bits), a PTID/subtype field 1914 (3 bits), a from destination station (DS) field 1916 (1 bit), a more fragments field 1918 (1 bit), a power management field 1920 (1 bit), a more data field 1922 (1 bit), a protected frame field 1924 (1 bit), an end of service period field 1926 (1 bit), an A3 present field 1928 (1 bit), and an acknowledgment policy field 1930 (1 bit).

With the reduced length, the MPDU 1900 does not include a QoS control field. In some embodiments, the client station 25 repurposes a sequence control field to include the resource request information, for example, the sequence control/resource request field 1904 includes the resource request information. In an embodiment, the client station 25 provides an indication that the sequence control field has been repurposed by omitting a frame body from the MPDU 1900. In an embodiment, the client station 25 provides an indication that the sequence control field has been repurposed by a preselected value within the type field 1912, for example, a PV1 type value.

In various embodiments, the sequence control/resource request field 1904 includes a resource type field 1960 (1 bit), a scale factor field 1962 (1 bit), and a resource request field 1964 (14 bits). The resource type field 1960 indicates whether uplink buffer information or a TXOP duration request is provided in the resource request field 1964, in various embodiments. In an embodiment, the resource type field 1960 has a value of "0" to indicate that uplink buffer information is provided and has a value of "1" to indicate that a TXOP duration request is provided. The scale factor field 1962 indicates a scale factor for the resource request field 1964, in various embodiments. In an embodiment, the scale factor field 1962 has a value of "0" to indicate that uplink buffer information is provided in units of one byte or that a TXOP duration is indicated in units of one microsecond, while a value of "1" indicates that uplink buffer information is provided in units of 256 bytes or that a TXOP duration is indicated in units of sixteen microseconds. In an embodiment, the resource type field 1960 is omitted, for example, where only one resource type is utilized (e.g., a size of an uplink buffer). In an embodiment, the scale factor field 1962 is omitted, for example, where only one scale factor is utilized (e.g., an uplink buffer length that is always expressed in units of four octets). In some embodiments, the resource request field 1964 has a length of 15 bits or 16 bits, where one or both of the resource type field 1960 and the scale factor field 1962 are omitted.

In some embodiments, an A-MPDU includes multiple instances of the MPDU 1900. In an embodiment, the client station 25 generates an A-MPDU having a plurality of MPDUs 1900 corresponding to a plurality of different traffic classes, respectively. In an embodiment, each of the plurality of MPDUs 1900 has a same acknowledgment policy (e.g., normal acknowledgment). In another embodiment, at least some of the plurality of MPDUs 1900 have different acknowledgment policies (e.g., normal acknowledgment and no acknowledgment). In an embodiment, the AP 14 generates and transmits a single acknowledgment frame (not shown) to acknowledge a received A-MPDU having multiple instances of the MPDU 1900 if at least one of the instances is correctly received.

Figure 20:
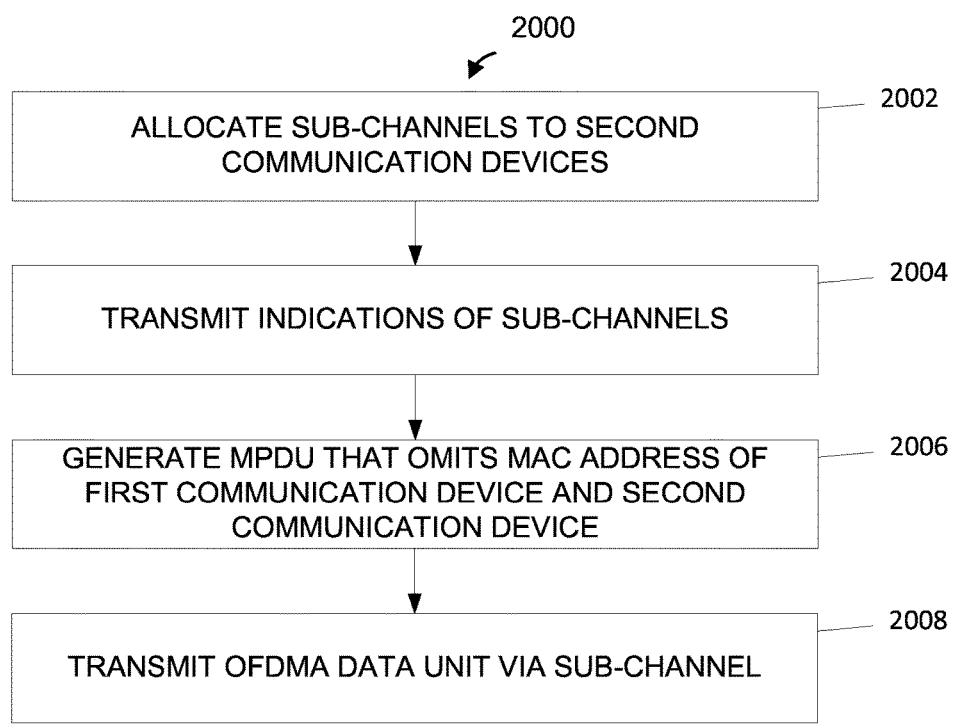
FIG. 20 is a flow diagram illustrating an example method for transmitting an OFDMA data unit, according to an embodiment.

FIG. 20 is a flow diagram illustrating an example method 2000 for transmitting an OFDMA data unit, according to an embodiment. In an embodiment, the method 2000 is implemented by an AP in the WLAN, according to an embodiment. With reference to FIG. 1, the method 2000 is implemented by the network interface 16, in an embodiment. For example, in one such embodiment, the PHY processing unit 20 is configured to implement the method 2000. According to another embodiment, the MAC processing 18 is also configured to implement at least a part of the method 2000. With continued reference to FIG. 1, in yet another embodiment, the method 2000 is implemented by the network interface 27 (e.g., the PHY processing unit 29 and/or the MAC processing unit 28). In other embodiments, the method 2000 is implemented by other suitable network interfaces.

At block 2002, respective sub-channels of an orthogonal frequency division multiplexing (OFDM) communication channel are allocated by a first communication device to two or more second communication devices for simultaneous OFDM transmission to the two or more second communication devices. In an embodiment, the allocation includes allocating a first sub-channel to a first one of the two or more second communication devices and a second sub-channel to a second one of the two or more second communication devices. In an embodiment, the first communication device is the AP 14 and the two or more second communication devices are client stations 25.

At block 2004, indications of the respective sub-channels allocated to the two or more second communication devices are transmitted by the first communication device to the two or more second communication devices. In an embodiment, for example, the indications of the respective sub-channels are transmitted in a scheduling frame, SYNC frame, or trigger frame.

At block 2006, a medium access control (MAC) protocol data unit (MPDU) that omits i) a MAC address of the first communication device, and ii) a MAC address of the first one of the two or more second communication devices is generated by the first communication device for transmission to the first one of the two or more second communication devices. In an embodiment, for example, the generated MPDU includes one of the MPDU 1000, 1050, 1100, 1150, 1200, 1250, 1300, 1400, 1500, 1550, 1600, 1625, 1650, 1900, or 1950.

At block 2008, an OFDMA data unit is transmitted by the first communication device via the OFDM communication channel. In an embodiment, the transmission includes transmitting an OFDM data unit that includes the MPDU via the first sub-channel to the first one of the two or more second communication devices.

In some embodiments, the first communication device generates the OFDMA data unit to include i) a physical layer (PHY) legacy preamble (e.g., the legacy portion 601-1), ii) a PHY non-legacy preamble (e.g., the non-legacy portion 601-2) that includes the indications of the respective sub-channels allocated to the two or more second communication devices, and iii) the MPDU (e.g., the data portion 616). In an embodiment, the PHY non-legacy preamble is generated to include i) the indications of the respective sub-channels allocated to the two or more second communication devices, and ii) an indication (e.g., the resource request field 1964) of a duration of a transmission opportunity in which the OFDMA data unit is to be transmitted. In an embodiment, the AP 14 omits from the MPDU (e.g., the MPDU 1050) i) the MAC address of the first communication device, ii) the MAC address of the second one of the two or more second communication devices, and iii) a MAC duration field.

In some embodiments, transmitting the indications includes transmitting a scheduling frame (e.g., OFDM data unit 1702) that i) includes the indications of the respective sub-channels allocated to the two or more second communication devices, and ii) is separate from the OFDMA data unit (e.g., the OFDM data unit 1704).

In some embodiments, generating the MPDU includes generating a type subfield of a frame control field of the MPDU to indicate that an aggregate MAC service data unit is included in the MPDU and generating a frame body field of the MPDU to include the aggregate MAC service data unit.

In various embodiments, a first frame control field of the MPDU is generated having i) a first type subfield (e.g., field 1422) and a first subtype subfield (e.g., field 1424) that correspond to a first MAC service data unit, ii) a second type subfield (e.g., field 1428) and a second subtype subfield (e.g., fields 1430 and 1434) that correspond to a second MAC service data unit, and iii) an indication (e.g., field 1426) that the MPDU includes the second MAC service data unit. In an embodiment, a partial frame control field (e.g., field 1406) of the MPDU is generated that omits a protocol version subfield, a second type subfield, and a second subtype subfield for the second MAC service data unit. In an embodiment, the MPDU is generated to include i) the first frame control field, ii) the first MAC service data unit, iii) the partial frame control field, and iv) the second MAC service data unit. In some embodiments, generating the MPDU includes generating a first frame control field (e.g., field 1502 or 1552) of the MPDU that corresponds to a first MAC service data unit, generating a wrap indicator field (e.g., field 1504 or 1554) of the MPDU, and generating the MPDU to include i) the first frame control field, ii) the wrap indicator field after the first frame control field, iii) the first MAC service data unit, and iv) the second MAC service data unit. The wrap indicator field has i) an indication that the MPDU includes a second MAC service data unit, and ii) a subtype subfield that corresponds to the second MAC service data unit, in an embodiment.

In some embodiments, the MPDU is a first MPDU and the first communication device also receives, from the first one of the two or more second communication devices, a second MPDU that omits i) the MAC address of the first communication device, and ii) the MAC address of the first one of the two or more second communication devices.

Figure 21:
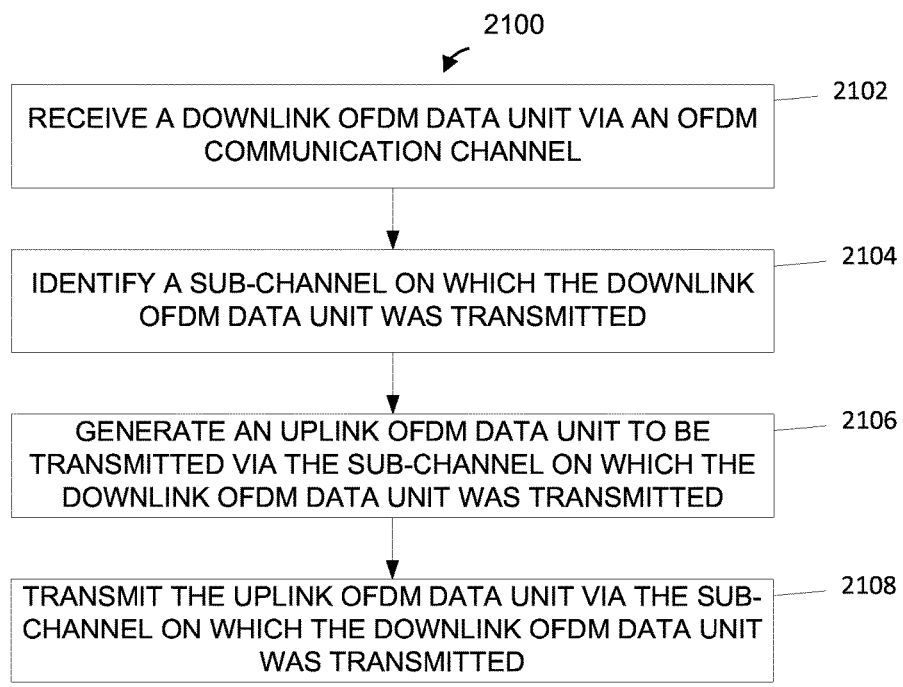
FIG. 21 is a flow diagram illustrating an example method for transmitting an OFDMA data unit, according to another embodiment.

FIG. 21 is a flow diagram illustrating an example method 2100 for transmitting an OFDMA data unit, according to another embodiment. In an embodiment, the method 2100 is implemented by a client station in the WLAN, according to an embodiment. With reference to FIG. 1, the method 2100 is implemented by the network interface 27, in an embodiment. For example, in one such embodiment, the PHY processing unit 29 is configured to implement the method 2100. According to another embodiment, the MAC processing 28 is also configured to implement at least a part of the method 2100. With continued reference to FIG. 1, in yet another embodiment, the method 2100 is implemented by the network interface 16 (e.g., the PHY processing unit 20 and/or the MAC processing unit 18). In other embodiments, the method 2100 is implemented by other suitable network interfaces.

At block 2102, a downlink orthogonal frequency division multiplexing (OFDM) data unit is received at a first communication device, from a second communication device, via an OFDM communication channel. In an embodiment, the first communication device is a client station 25 and the second communication device is an AP 14. In an embodiment, the downlink OFDM data unit is a scheduling frame, SYNC frame, or trigger frame.

At block 2104, a sub-channel of the OFDM communication channel on which the downlink OFDM data unit was transmitted by the second communication device is identified by the first communication device.

At block 2106, an uplink OFDM data unit to be transmitted via the sub-channel on which the downlink OFDM data unit was transmitted is generated by the first communication device in response to the downlink OFDM data unit. In an embodiment, generating the uplink OFDM data unit includes generating a medium access control (MAC) protocol data unit (MPDU) that omits i) a MAC address of the first communication device, and ii) a MAC address of the second communication device. In an embodiment, for example, the uplink OFDM data unit includes one of the MPDU 1000, 1050, 1100, 1150, 1200, 1250, 1300, 1400, 1500, 1550, 1600, 1625, 1650, 1900, or 1950.

At block 2108, the uplink OFDM data unit is transmitted by the first communication device to the second communication device via the sub-channel on which the downlink OFDM data unit was transmitted.

In some embodiments, the MPDU is a first MPDU (e.g., corresponding to control content 1404) and receiving the downlink OFDM data unit includes receiving an orthogonal frequency division multiple access (OFDMA) data unit that includes i) a physical layer (PHY) legacy preamble (e.g., legacy portion 601-1), ii) a PHY non-legacy preamble (e.g., non-legacy portion 601-2) that includes an indication of the sub-channel on which the downlink OFDM data unit was transmitted by the second communication device, and iii) a second MPDU (e.g., corresponding to frame body 1412) that omits the MAC address of the first communication device and the MAC address of the second communication device. In an embodiment, the downlink OFDM data unit includes a scheduling frame (e.g., OFDM data unit 1702) with an indication of the sub-channel of the OFDM communication channel on which the downlink OFDM data unit was transmitted by the second communication device. In an embodiment, the downlink OFDM data unit includes a data frame and the scheduling frame and the MPDU i) includes an acknowledgment to the data frame, and ii) omits an MPDU delimiter, as described above with respect to FIG. 18.

In various embodiments, generating the MPDU includes generating a type subfield of a frame control field of the MPDU to indicate that an aggregate MAC service data unit is included in the MPDU and generating a frame body field of the MPDU to include the aggregate MAC service data unit.

In some embodiments, generating the MPDU includes generating a power save poll frame that includes an association identifier (AID) of the first communication device in a frame body of the PS-poll frame, as described above with respect to FIG. 13.

In an embodiment, the downlink OFDM data unit includes an aggregate MPDU with a data frame and a scheduling frame and generating the MPDU includes generating an aggregate MPDU that i) includes an acknowledgment to the data frame, ii) that omits i) a MAC address of the first communication device, and ii) a MAC address of the second communication device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for transmitting an orthogonal frequency division multiple access (OFDMA) data unit, the method comprising:
    allocating, by a first communication device, respective sub-channels of an orthogonal frequency division multiplexing (OFDM) communication channel to two or more second communication devices for simultaneous OFDM transmission to the two or more second communication devices, including allocating i) a first sub-channel to a first one of the two or more second communication devices, and ii) a second sub-channel to a second one of the two or more second communication devices;
    transmitting, by the first communication device and to the two or more second communication devices, indications of the respective sub-channels allocated to the two or more second communication devices;
    generating, by the first communication device for transmission to the first one of the two or more second communication devices, a single medium access control (MAC) protocol data unit (MPDU) that omits i) a MAC address of the first communication device, and ii) a MAC address of the first one of the two or more second communication devices, including
        generating a first frame control field of the single MPDU having i) a first type subfield and a first subtype subfield that correspond to a first MAC service data unit (MSDU), ii) a second type subfield and a second subtype subfield that correspond to a second MSDU, and iii) an indication that the single MPDU includes the second MSDU; and
    transmitting, by the first communication device, an orthogonal frequency division multiple access (OFDMA) data unit via the OFDM communication channel, wherein the single MPDU is included in a portion of the OFDMA data unit transmitted via the first sub-channel to the first one of the two or more second communication devices, wherein the omitted MAC address of the first communication device and the omitted MAC address of the first one of the two or more second communication devices are identifiable based on the allocated sub-channel via which the single MPDU is transmitted.

2. The method of claim 1, further comprising generating, by the first communication device, the OFDMA data unit to include i) a physical layer (PHY) legacy preamble, ii) a PHY non-legacy preamble that includes the indications of the respective sub-channels allocated to the two or more second communication devices, and iii) the single MPDU, wherein the single MPDU is a data frame.

3. The method of claim 2, wherein:
    generating the OFDMA data unit comprises generating the PHY non-legacy preamble to include i) the indications of the respective sub-channels allocated to the two or more second communication devices, and ii) an indication of a duration of a transmission opportunity in which the OFDMA data unit is to be transmitted; and generating the single MPDU comprises omitting from the single MPDU i) the MAC address of the first communication device, ii) the MAC address of the second one of the two or more second communication devices, and iii) a MAC duration field.

4. The method of claim 3, wherein generating the single MPDU comprises generating a frame check sequence field of the single MPDU that includes a receiver address and a transmitter address of the single MPDU.

5. The method of claim 3, wherein generating the OFDMA data unit comprises scrambling the single MPDU based on a scramble seed of an eliciting frame.

6. The method of claim 1, wherein transmitting the indications comprises transmitting a scheduling frame that i) includes the indications of the respective sub-channels allocated to the two or more second communication devices, and ii) is separate from the OFDMA data unit.

7. The method of claim 1, wherein:
generating the OFDMA data unit comprises generating the OFDMA data unit based on a scheduling frame that includes the indications of the respective sub-channels; and
generating the single MPDU comprises omitting from the single MPDU i) the MAC address of the first communication device, ii) the MAC address of the second one of the two or more second communication devices, and iii) a MAC duration field.

8. The method of claim 7, wherein generating the single MPDU comprises generating a frame check sequence field of the single MPDU that includes a receiver address and a transmitter address of the single MPDU.

9. The method of claim 7, wherein generating the OFDMA data unit comprises scrambling the single MPDU based on a scramble seed of an eliciting frame.

10. The method of claim 1, wherein generating the first frame control field of the single MPDU comprises:
generating the first type subfield of the frame control field of the single MPDU to indicate that an aggregate MSDU is included in the single MPDU; and
generating a frame body field of the single MPDU to include the aggregate MSDU.

11. The method of claim 1, wherein generating the single MPDU further comprises:
generating a partial frame control field of the single MPDU that omits a protocol version subfield, a second type subfield, and a second subtype subfield for the second MSDU; and
generating the single MPDU to include i) the first frame control field, ii) the first MSDU, iii) the partial frame control field, and iv) the second MSDU.

12. The method of claim 1, wherein the single MPDU is a first MPDU, and wherein the method further comprises receiving, by the first communication device and from the first one of the two or more second communication devices, a second MPDU that omits i) the MAC address of the first communication device, and ii) the MAC address of the first one of the two or more second communication devices.

13. A first communication device, comprising:
a network interface device having one or more integrated circuits configured to:
allocate respective sub-channels of an orthogonal frequency division multiplexing (OFDM) communication channel to two or more second communication devices for simultaneous OFDM transmission to the two or more second communication devices, including allocation of i) a first sub-channel to a first one of the two or more second communication devices, and ii) a second sub-channel to a second one of the two or more second communication devices;
transmit, to the two or more second communication devices, indications of the respective sub-channels allocated to the two or more second communication devices;
generate, for transmission to the first one of the two or more second communication devices, a single medium access control (MAC) protocol data unit (MPDU) that omits i) a MAC address of the first communication device, and ii) a MAC address of the first one of the two or more second communication devices, including generating a first frame control field of the single MPDU having i) a first type subfield and a first subtype subfield that correspond to a first MSDU, ii) a second type subfield and a second subtype subfield that correspond to a second MSDU, and iii) an indication that the single MPDU includes the second MSDU; and
transmit an orthogonal frequency division multiple access (OFDMA) data unit via the OFDM communication channel, wherein the single MPDU is included in a portion of the OFDMA data unit transmitted via the first sub-channel to the first one of the two or more second communication devices, wherein the omitted MAC address of the first communication device and the omitted MAC address of the first one of the two or more second communication devices are identifiable based on the allocated sub-channel via which the single MPDU is transmitted.

14. The first communication device of claim 13, wherein the one or more integrated circuits are configured to generate the OFDMA data unit to include i) a physical layer (PHY) legacy preamble, ii) a PHY non-legacy preamble that includes the indications of the respective sub-channels allocated to the two or more second communication devices, and iii) the single MPDU, wherein the single MPDU is a data frame.

15. The first communication device of claim 14, wherein the one or more integrated circuits are configured to:
generate the PHY non-legacy preamble to include i) the indications of the respective sub-channels allocated to the two or more second communication devices, and ii) an indication of a duration of a transmission opportunity in which the OFDMA data unit is to be transmitted; and
omit from the single MPDU i) the MAC address of the first communication device, ii) the MAC address of the second one of the two or more second communication devices, and iii) a MAC duration field.

16. The method of claim 15, wherein generating the single MPDU comprises generating a frame check sequence field of the single MPDU that includes a receiver address and a transmitter address of the single MPDU.

17. The method of claim 15, wherein generating the OFDMA data unit comprises scrambling the single MPDU based on a scramble seed of an eliciting frame.

18. The first communication device of claim 13, wherein the one or more integrated circuits are configured to transmit a scheduling frame that i) includes the indications of the respective sub-channels allocated to the two or more second communication devices, and ii) is separate from the OFDMA data unit.

19. The method of claim 13, wherein the one or more integrated circuits are configured to generate the OFDMA data unit based on a scheduling frame that includes the indications of the respective sub-channels; and wherein the one or more integrated circuits are configured to omit from the single MPDU i) the MAC address of the first communication device, ii) the MAC address of the second one of the two or more second communication devices, and iii) a MAC duration field.

20. The method of claim 19, wherein generating the single MPDU comprises generating a frame check sequence field of the single MPDU that includes a receiver address and a transmitter address of the single MPDU.

21. The method of claim 19, wherein generating the OFDMA data unit comprises scrambling the single MPDU based on a scramble seed of an eliciting frame.

22. A method for simultaneous communication with multiple communication devices in a wireless local area network, the method comprising:

receiving, at a first communication device and from a second communication device, a downlink orthogonal frequency division multiplexing (OFDM) data unit via an OFDM communication channel as part of an orthogonal frequency division multiple access (OFDMA) data unit that includes a first medium access control (MAC) protocol data unit (MPDU) that omits a MAC address of the first communication device and a MAC address of the second communication device;

identifying, by the first communication device, a sub-channel of the OFDM communication channel on which the downlink OFDM data unit was transmitted by the second communication device;

identifying, by the first communication device, the MAC address of the second communication device based on the sub-channel via which the downlink OFDM data unit is received;

generating, by the first communication device in response to the downlink OFDM data unit, an uplink OFDM data unit to be transmitted to the second communication device via the sub-channel on which the downlink OFDM data unit was transmitted, including generating a second, single MPDU that omits i) a MAC address of the first communication device, and ii) a MAC address of the second communication device, including generating a first frame control field of the second, single MPDU having i) a first type subfield and a first subtype subfield that correspond to a first MSDU, ii) a second type subfield and a second subtype subfield that correspond to a second MSDU, and iii) an indication that the second, single MPDU includes the second MSDU; and transmitting the uplink OFDM data unit with the second, single MPDU to the second communication device via the sub-channel on which the downlink OFDM data unit was transmitted.

23. The method of claim 22, wherein:

the OFDMA data unit includes i) a physical layer (PHY) legacy preamble, ii) a PHY non-legacy preamble that includes an indication of the sub-channel on which the downlink OFDM data unit was transmitted by the second communication device, and iii) the first MPDU that omits the MAC address of the first communication device and the MAC address of the second communication device, wherein the first MPDU is a data frame.

24. The method of claim 22, wherein the downlink OFDM data unit includes a scheduling frame with an indication of the sub-channel of the OFDM communication channel on which the downlink OFDM data unit was transmitted by the second communication device.

25. The method of claim 24, wherein:

the downlink OFDM data unit includes a data frame and the scheduling frame; and the second, single MPDU i) includes an acknowledgment to the data frame, and ii) omits an MPDU delimiter.

26. The method of claim 22, wherein generating the second, single MPDU comprises generating a power save poll (PS-poll) frame that includes an association identifier (AID) of the first communication device in a frame body of the PS-poll frame.

27. The method of claim 22, wherein:

the downlink OFDM data unit includes an aggregate MPDU with a data frame and a scheduling frame;

generating the second, single MPDU comprises generating an aggregate MPDU that i) includes an acknowledgment to the data frame, and ii) omits a) a MAC address of the first communication device, and b) a MAC address of the second communication device.

28. A first communication device, comprising:

a network interface device having one or more integrated circuits configured to:

receive, from a second communication device, a downlink orthogonal frequency division multiplexing (OFDM) data unit via an OFDM communication channel as part of an orthogonal frequency division multiple access (OFDMA) data unit that includes a first medium access control (MAC) protocol data unit (MPDU) that omits a MAC address of the first communication device and a MAC address of the second communication device;

identify a sub-channel of the OFDM communication channel on which the downlink OFDM data unit was transmitted by the second communication device;

identify the MAC address of the second communication device based on the sub-channel via which the downlink OFDM data unit is received;

generate, in response to the downlink OFDM data unit, an uplink OFDM data unit to be transmitted via the sub-channel on which the downlink OFDM data unit was transmitted, including generation of a second, single MPDU that omits i) the MAC address of the first communication device, and ii) the MAC address of the second communication device, including generating a first frame control field of the second, single MPDU having i) a first type subfield and a first subtype subfield that correspond to a first MSDU, ii) a second type subfield and a second subtype subfield that correspond to a second MSDU, and iii) an indication that the second, single MPDU includes the second MSDU; and transmit the uplink OFDM data unit to the second communication device via the sub-channel on which the downlink OFDM data unit was transmitted.

29. The first communication device of claim 28, wherein:

the OFDMA data unit includes i) a physical layer (PHY) legacy preamble, ii) a PHY non-legacy preamble that includes an indication of the sub-channel on which the downlink OFDM data unit was transmitted by the second communication device, and iii) the first MPDU that omits the MAC address of the first communication device and the MAC address of the second communication device, wherein the first MPDU is a data frame.

30. The first communication device of claim 28, wherein the downlink OFDM data unit includes a scheduling frame with an indication of the sub-channel of the OFDM communication channel on which the downlink OFDM data unit was transmitted by the second communication device.

31. The first communication device of claim 28, wherein:
the downlink OFDM data unit includes a data frame and the scheduling frame; and
the second, single MPDU i) includes an acknowledgment to the data frame, and ii) omits an MPDU delimiter.

32. The first communication device of claim 28, wherein the one or more integrated circuits are configured to generate a power save poll (PS-poll) frame that includes an association identifier (AID) of the first communication device in a frame body of the PS-poll frame.

* * * * *